United States Patent
Ando

(10) Patent No.: US 6,243,549 B1
(45) Date of Patent: *Jun. 5, 2001

(54) IMAGE FORMING APPARATUS FOR FORMING A PLURALITY PAGE IMAGES FORMED ON ONE SIDE OF SHEET ON BOTH SIDES OF SHEET

(75) Inventor: Eiichi Ando, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/443,870

(22) Filed: Nov. 19, 1999

Related U.S. Application Data

(63) Continuation of application No. 08/979,367, filed on Nov. 26, 1997, now Pat. No. 5,999,767, which is a continuation of application No. 08/622,371, filed on Mar. 27, 1996, now abandoned.

(30) Foreign Application Priority Data

Mar. 28, 1995 (JP) .................................................. 7-94314

(51) Int. Cl.$^7$ .................................................. G03G 15/00
(52) U.S. Cl. ............................................ 399/85; 358/1.18
(58) Field of Search ............................... 399/85, 363, 364, 399/408, 410; 358/1.18, 1.2, 296, 300, 401, 449, 450

(56) References Cited

U.S. PATENT DOCUMENTS

| | | | |
|---|---|---|---|
| 4,876,562 | 10/1989 | Suzuki et al. | 346/160 |
| 4,995,601 | 2/1991 | Ohashi et al. | 271/127 |
| 5,023,658 | 6/1991 | Toyama et al. | 355/72 |
| 5,461,459 | 10/1995 | Muramatsu et al. | 355/203 |
| 5,508,798 | 4/1996 | Yamada | 355/324 |
| 5,530,560 | 6/1996 | Nakajima | 358/453 |
| 5,768,488 | * 6/1998 | Stone et al. | 395/1.18 |
| 5,940,543 | * 8/1999 | Isemura et al. | 382/284 |
| 5,999,767 | * 12/1999 | Ando | 399/85 |

* cited by examiner

Primary Examiner—Joan Pendegrass
(74) Attorney, Agent, or Firm—Fitzpatrick, Cella, Harper & Scinto

(57) ABSTRACT

An image forming apparatus including an image forming unit for forming images of two pages on one side of a sheet and forming images of other two pages on the other side of the sheet, a storage unit for storing an image to be formed by the image forming unit, and a control unit for controlling to store images in the storage unit in a first mode of fastening or to fasten the longer side of the sheet so as to locate an image of a (4N−1)-th page at the back side of an image of a (4N−3)-th page and locate an image of a 4N-th page at the back side of an image of a (4N−2)-th page, and in a second mode of fastening or to fasten the shorter side of the sheet so as to locate an image of a 4N-th page at the back side of an image of a (4N−3)-th page and locate an image of a (4N−1)-th page at the back side of an image of a (4N−2)-th page, wherein the image forming unit forms the images in the storage unit located by the control unit, on the sheet.

10 Claims, 23 Drawing Sheets

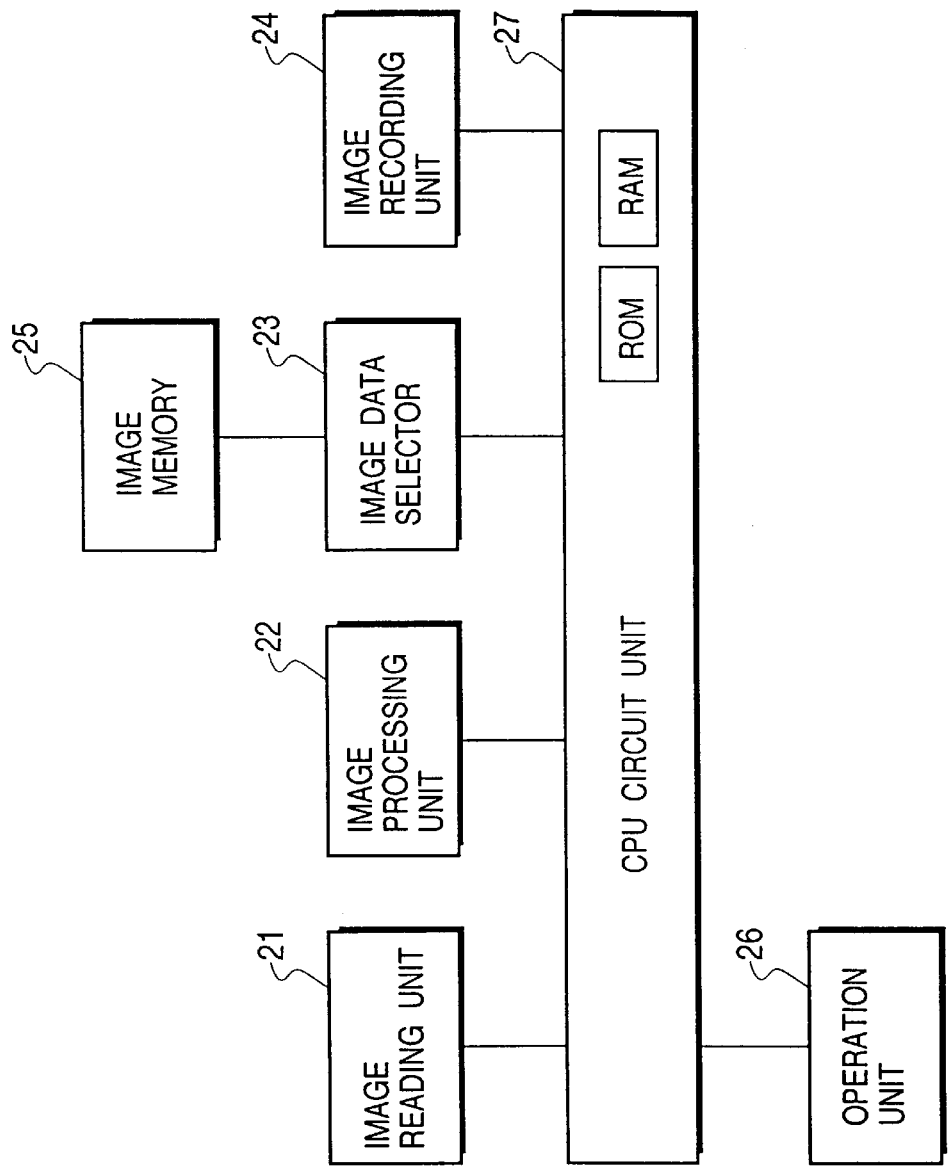

FIG. 6A

SELECT ORIGINAL SIZE.  ⎯138
▶ A5    B5    STMT
  A5R   B5R   STMTR
  A4    B4    LTR
  A4R         LTRR
  A3          LGL
              LTR

FIG. 6B

SELECT TYPE OF LAYOUT.  ⎯138
▶ 2in1   4in1
  2in1 TWO SIDES, 4in1 TWO SIDES
INPUT NUMBER OF ORIGINAL.
  AUTO    · · SHEETS

FIG. 6C

SELECT COPY PAPER SIZE.  ⎯138
     ▶  A4
        A3

FIG. 6D

SELECT TYPE OF ORIGINAL.  ⎯138
     ▶  HORIZONTAL WRITING
        VERTICAL WRITING

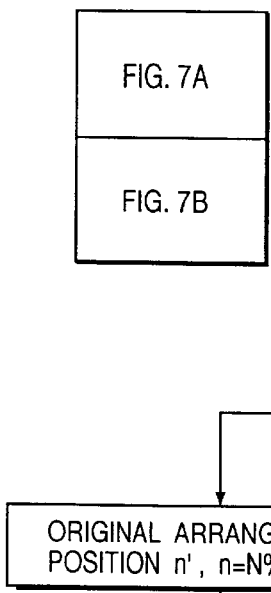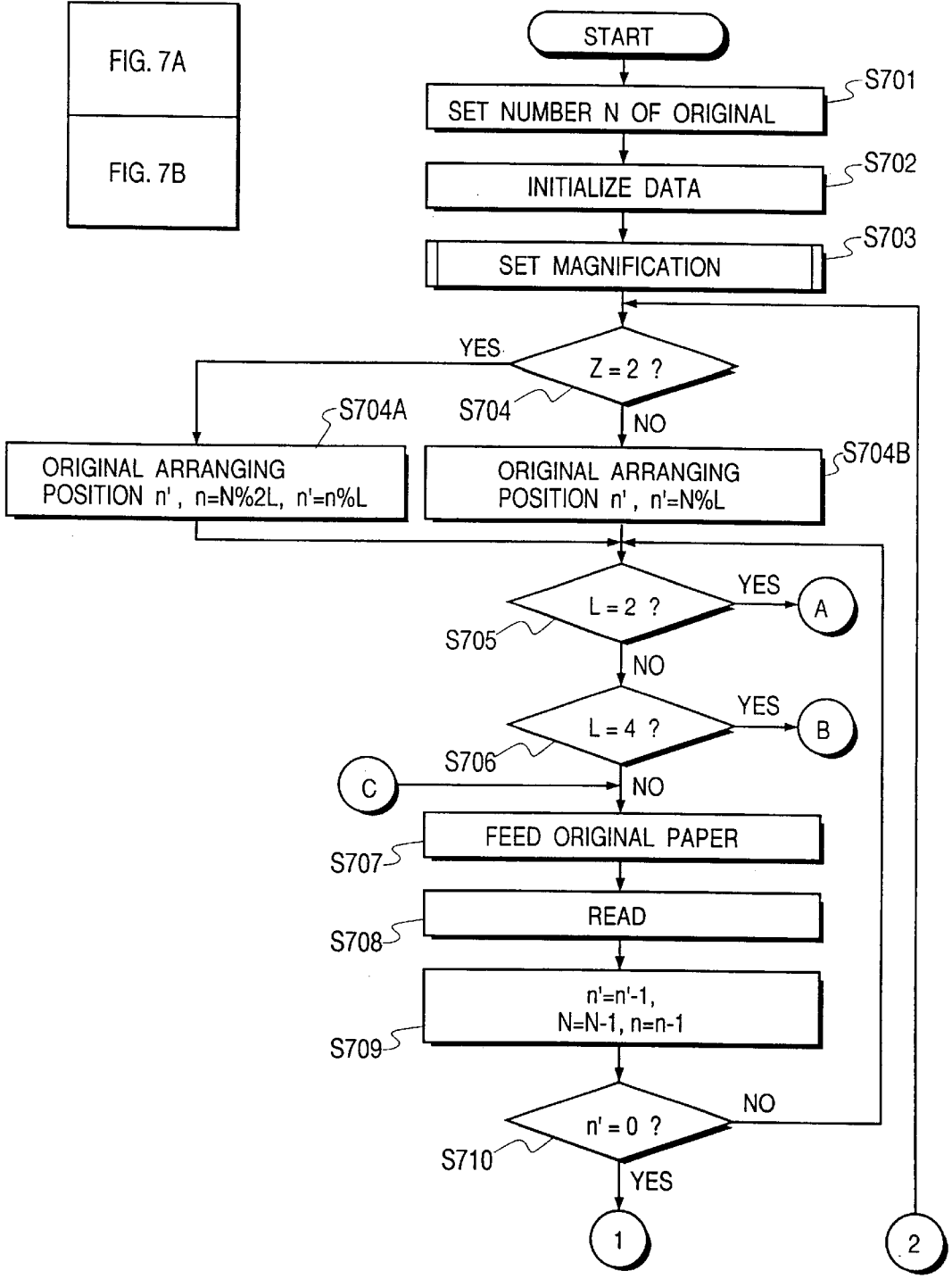

| CLASSIFICATION OF ORIGINAL | | | PAPER FEEDING DIRECTION | | | |
|---|---|---|---|---|---|---|
| | | | LONG EDGE FIRST FEEDING | | SHORT EDGE FIRST FEEDING | |
| | | | FRONT | BACK | FRONT | BACK |
| DIRECTION OF ORIGINAL, VERTICAL LONG | HORIZONTAL WRITING | | 1 3 / 2 4 | 5 7 / 6 8 | 1 3 / 2 4 | 5 7 / 6 8 |
| | VERTICAL WRITING | | 3 1 / 4 2 | 7 5 / 8 6 | 3 1 / 4 2 | 7 5 / 8 6 |
| DIRECTION OF ORIGINAL, HORIZONTAL LONG | HORIZONTAL WRITING | | 1 3 / 2 4 | 5 7 / 6 8 | 1 3 / 2 4 | 5 7 / 6 8 |
| | VERTICAL WRITING | | 3 1 / 4 2 | 7 5 / 8 6 | 3 1 / 4 2 | 7 5 / 8 6 |

FIG. 18

| CLASSIFICATION OF ORIGINAL | | | PAPER FEEDING DIRECTION | | | |
|---|---|---|---|---|---|---|
| | | | LONG EDGE FIRST FEEDING | | SHORT EDGE FIRST FEEDING | |
| | | | FRONT | BACK | FRONT | BACK |
| DIRECTION OF ORIGINAL, VERTICAL LONG | HORIZONTAL WRITING | 1 2 / 3 4 | 5 6 / 7 8 | 1 2 / 3 4 | 5 6 / 7 8 |
| | VERTICAL WRITING | 3 1 / 4 2 | 7 5 / 8 6 | 3 1 / 4 2 | 7 5 / 8 6 |
| DIRECTION OF ORIGINAL, HORIZONTAL LONG | HORIZONTAL WRITING | 1 2 / 3 4 | 5 6 / 7 8 | 1 2 / 3 4 | 5 6 / 7 8 |
| | VERTICAL WRITING | 3 1 / 4 2 | 7 5 / 8 6 | 3 1 / 4 2 | 7 5 / 8 6 |

FIG. 19

| CLASSIFICATION OF ORIGINAL | | | PAPER FEEDING DIRECTION | | | | |
|---|---|---|---|---|---|---|---|
| | | | LONG EDGE FIRST FEEDING | | SHORT EDGE FIRST FEEDING | | |
| | | | FRONT | BACK | FRONT | BACK | |
| DIRECTION OF ORIGINAL, VERTICAL LONG | HORIZONTAL WRITING | | 1 3 / 2 4 | 5 7 / 6 8 | 1 3 / 2 4 | 5 7 / 6 8 |
| | VERTICAL WRITING | | 2 1 / 4 3 | 6 5 / 8 7 | 2 1 / 4 3 | 6 5 / 8 7 |
| DIRECTION OF ORIGINAL, HORIZONTAL LONG | HORIZONTAL WRITING | | 1 3 / 2 4 | 5 7 / 6 8 | 1 3 / 2 4 | 5 7 / 6 8 |
| | VERTICAL WRITING | | 2 1 / 4 3 | 6 5 / 8 7 | 2 1 / 4 3 | 6 5 / 8 7 |

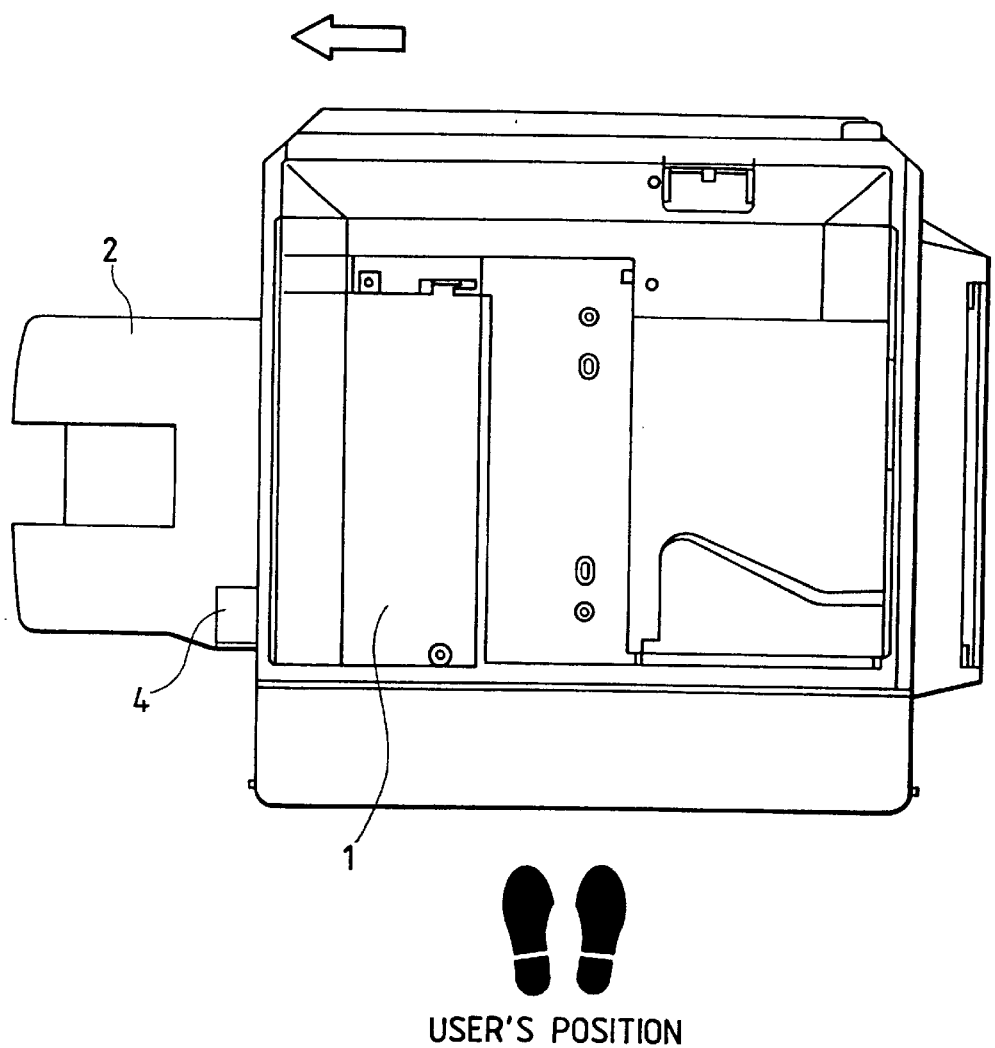

IMAGE FORMING APPARATUS FOR FORMING A PLURALITY PAGE IMAGES FORMED ON ONE SIDE OF SHEET ON BOTH SIDES OF SHEET

This application is a continuation of Ser. No. 08/979,367 filed Nov. 2, 1997, now U.S. Pat. No. 5,999,767, which is a continuation of Ser. No. 08/622,371 filed Mar. 27, 1996, now abandoned.

BACKGROUND OF THE INVENTION

1. Field of the Invention

The present invention relates to an image forming apparatus for forming a plurality of page images formed on one side of a sheet on both sides of a sheet.

2. Related Background Art

A conventional image forming apparatus has a 2-in-1 mode and a 4-in-1 mode and records images on the front and back sides of a recording sheet. The 2-in-1 mode copies two originals on the same side of one sheet, and the 4-in-1 mode copies four originals on the same side of one sheet.

The layouts of images formed after originals are stacked in a stacker of an image forming apparatus are shown in FIGS. 21 and 22 which illustrate the directions of originals and sheet feed directions.

FIG. 23 illustrates the definitions of an original direction and a sheet feed direction. The original direction indicates whether an original placed in a stacker at a correct direction as viewed by a user positioned in front of the image forming apparatus, is vertically long or horizontally long relative to the arrow direction shown in FIG. 23. The sheet feed direction indicates whether a long edge or short edge of a sheet is first fed.

FIG. 21 shows the positional relationship between images recorded on the both sides of a sheet in the 2-in-1 mode, and FIG. 22 shows the positional relationship between images recorded on the both sides of a sheet in the 4-in-1 mode. In FIGS. 21 and 22, the sheet in the "front" column shows the state when viewed down to a paper ejection tray 2. A bold line 3 shows a staple fastened with a stapler 4. Originals are stacked in the order of 1, 2, 3, 4, 5, 6, 7, and 8 from the top to the bottom. If the numerals 1 to 8 are in the correct direction as viewed from a user, it is assumed that each original is placed at the correct direction.

However, both the sheets of originals copied in the 2-in-1 mode and the sheets of originals copied in the 4-in-1 mode are fastened by a single staple 3. Therefore, these sheets can be turned over either on the vertical side or on the horizontal side. Assuming that the contents of a sheet on the front side are at the correct direction, the user cannot know at once which side is used to turn over pages. The user is required to check the correct turnover direction through a try and error basis.

In order to avoid this problem, the user adds another staple, resulting in a cumbersome work with possible errors.

If the contents of an original are written vertically, the copied images are disposed from the left to the right as the originals in the original stacker 1 are copied sequentially downward. Therefore, a user feels something different from the original images.

SUMMARY OF THE INVENTION

It is an object of the present invention to provide an image forming apparatus which can solve the above problems.

It is another object of the present invention to provide an image forming apparatus capable of smoothly reading a plurality of sheets recorded with original images like reading a book.

In accordance with one aspect of the invention there is provided an image forming apparatus with a method for forming images of four pages on the front side of a sheet, images of (8N–7)-th, (8N–6)-th, (8N–5)-th, and (8N–4)-th pages being formed respectively upper left, upper right, lower left, and lower right of the sheet, and forming images of four other pages on the back side of the sheet; a step of determining the arrangement locations of the plural images to be formed on the back side of the sheet, in a first mode of fastening or to fasten a longer side of the sheet and in the case of a portrait image or in a second mode of fastening or to fasten a shorter side of the sheet and in the case of a landscape image, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages; and a step of determining the arrangement locations of the plural images to be formed on the back side of the sheet, in said first mode and in the case of a landscape image or in said second mode and in the case of a landscape image or in said second mode and in the case of a portrait image, so as to locate images of (8N–1)-th, 8N-th, (8N–3)-th, and (8N–2)-th pages respectively at the back sides of images of (8N–7)-th, (8N–6)-th, (8N–5)-th, and (8N–4)-th pages.

The other objects and advantages of the present invention will become apparent from the following detailed description when read in conjunction with the accompanying drawings.

BRIEF DESCRIPTION OF THE DRAWINGS

FIG. 2 is a block diagram showing the electrical structure of the image forming apparatus.

FIGS. 6A to 6D are diagrams illustrating a process of setting a reduction layout mode.

FIG. 15 is a diagram illustrating the positions and directions of images formed in the 2-layout mode.

FIG. 16 is a diagram illustrating the positions and directions of images formed in the 4-layout mode.

FIG. 17 is a diagram illustrating another example of the positions and directions of images formed in the 4-layout mode.

FIG. 18 is a diagram illustrating a further example of the positions and directions of images formed in the 4-layout mode.

FIG. 19 is a diagram illustrating a still further example of the positions and directions of images formed in the 4-layout mode.

FIG. 23 is a diagram illustrating the definitions of an original direction and a sheet feed direction.

DETAILED DESCRIPTION OF THE PREFERRED EMBODIMENTS

Figure 1:
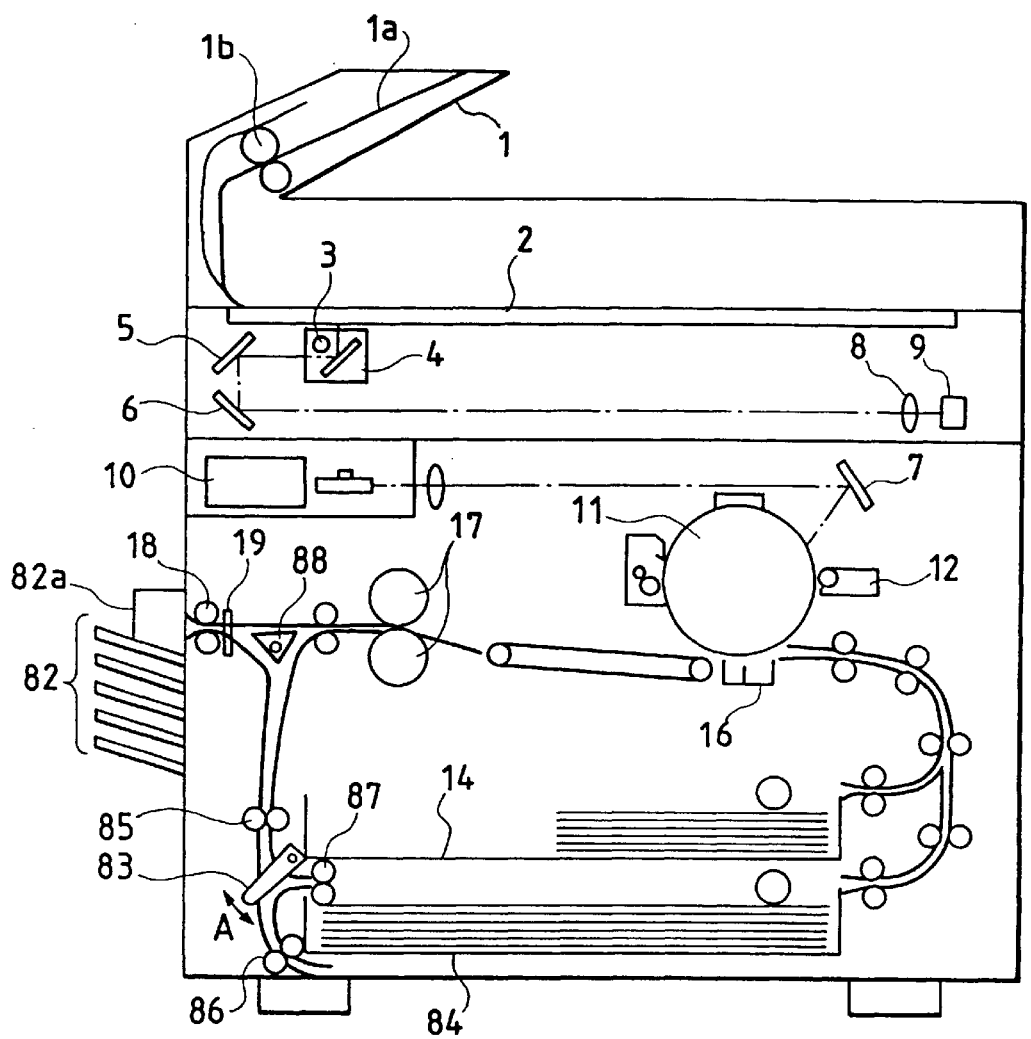
FIG. 1 is a diagram showing the structure of an image forming apparatus according to an embodiment of the invention.

An embodiment of an image forming apparatus of this invention will be described. FIG. 1 is a diagram showing the structure of the image forming apparatus of the embodiment. In FIG. 1, reference numeral 1 represents an original feeder.

As originals are placed on an original stacker 1a in a correct direction as viewed from an operator standing in front of the image forming apparatus, they are sequentially transported one after another by an original feed roller pair 1b to an original support glass plate 2.

As the original is transported, a lamp 3 is turned on, and a scanner unit 4 moves to illuminate the original. Light reflected from the original passes via mirrors 5 and 6 through a lens 8 and is applied to an image sensor unit 9.

An image inputted to the image sensor unit 9 is processed in response to a control signal from a CPU circuit unit 27 to be described later, and directly inputted to an exposure control unit 10.

Alternatively, the image may be temporarily stored in an unrepresented image memory and read therefrom, and thereafter inputted to the exposure control unit 10.

An image signal from the image sensor unit 9 is converted into an optical signal by the exposure control unit 10. Light modulated by the image signal is applied to a photosensitive member 11 to form a latent image which is developed by a developer 12. Synchronously with this development, a paper sheet is transported from a paper stacker 14 and the developed toner image is transferred to the sheet by a transfer unit 16.

The transferred toner image is fixed to the sheet by a fixer unit 17. If a both-side copy mode is selected, the sheet is fed to transport rollers 85 and 86 by a paper eject flapper 88. Immediately when the back end of the sheet passes through a turnover flapper 83, the turnover flapper 83 switches to position A shown in FIG. 1. At the same time, the transport roller 86 rotates in the reverse direction and the sheet is placed in an intermediate tray 84 by the transport roller 87.

In order to form an image on the back side of the sheet, it is again fed and the image is formed. Thereafter, the sheet is ejected out of a paper ejector 18 to the outside of the apparatus. If a single side copy mode is selected, the sheet is ejected immediately after it is fixed. The ejected sheet is placed on a stapler/sorter 82. After all images of the originals are formed, two staples are fastened with a stapler 82a at the positions on the paper ejector 18 side.

FIG. 2 is a block diagram showing the electrical structure of the image forming apparatus. Referring to FIG. 2, an image reading unit 21 is constituted by an optical system for receiving light reflected from an original image, a CCD for converting the reflected light from the optical system into an analog signal, and an A/D converter for converting the analog signal outputted from CCD into a digital signal. The read original image is sent to an image processing unit 22.

The image processing unit 22 is constituted by a shading correction circuit, a light color density converter circuit, and an image editor circuit for editing an image such as magnification change, position change, and ornamentation in response to an instruction from the operator. The image processing unit 22 corrects or edits the image supplied from the image reading unit 21.

The corrected or edited image is supplied via an image data selector 23 to an image memory 25 or an image recording unit 24.

The image data selector 23 is constituted by a selecting circuit and a synthesizing circuit. The selecting circuit selects one of three buses in response to an instruction from the CPU circuit unit 27, the buses including a bus for sending image data from the image processing unit 22 to the image recording unit 24, a bus for sending image data from the image processing unit 22 to the image memory 25, and a bus for sending image data read from the image memory 25 to the image recording unit 24. The synthesizing circuit synthesizes the image data sent from the image processing unit 22 and the image data read from the image memory 25.

The image recording unit 24 transfers an image to a recording sheet in accordance with an image data density signal supplied from the image data selector 23.

The image memory 25 writes image data supplied from the image data selector 23 in the image memory at a predetermined position, or reads image data and supplies it to the image data selector 23, in response to an instruction from the CPU circuit unit 27. The image memory 25 also performs an image rotation process or an image synthesizing process.

The CPU circuit unit 27 controls the whole apparatus, the image position and direction, and the operation of the stapler/sorter 82. The CPU circuit unit 27 is constituted by: a ROM for storing a control program, an error processing program, and other data; a RAM used for working areas of various programs; and a control unit for various timers.

An operation unit 26 has: a variety of keys for informing the image processing unit of the image edit contents and supplying to an image forming operation information such as the number of copies; a display unit for displaying manipulation contents; and other devices.

Figure 3:
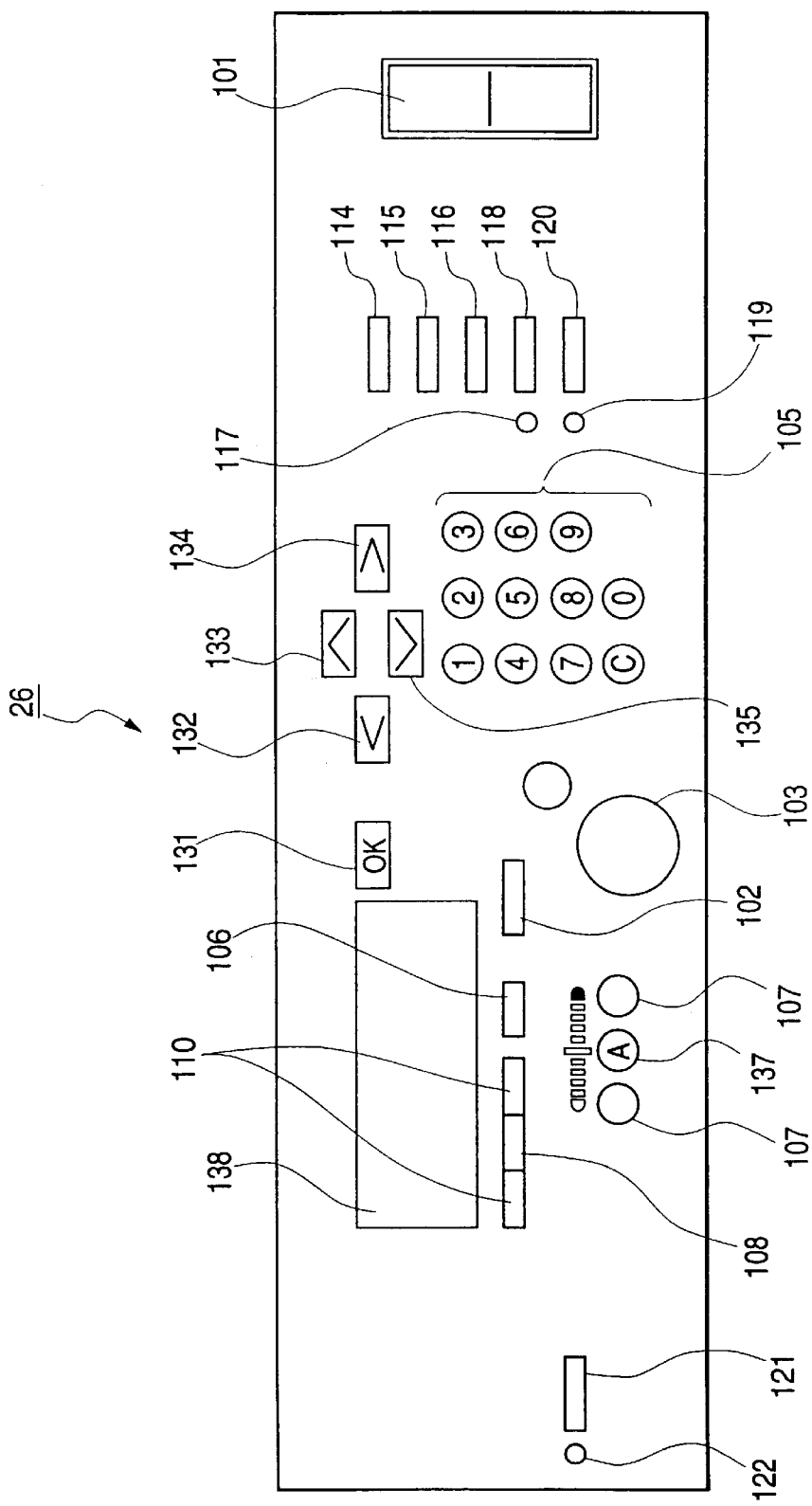
FIG. 3 is a front view of an operation unit 26.

FIG. 3 is a front view of the operation unit 26. On the console panel, a display unit 138 made of a liquid crystal display with a dot matrix and various keys are mounted.

The liquid crystal display unit 138 displays the status of the apparatus, the number of copies, a magnification, a selected paper sheet, and various operation screens, and is operated by control keys 131 to 135 and other keys. A start key 103 is used for starting a copy operation, and a return key 102 is used for returning from a set mode to the standard mode. A key group 105 includes ten keys from 0 to 9 for inputting the number of copies, a zoom magnification, and the like, and a clear key for clearing an input. A density key 107 is used for increasing or decreasing a density, the set density being displayed on a display unit 141.

A key 137 is a key for turning on and off an automatic density control function and includes its display unit. A key 106 is a key for selecting a paper feed stage and an automatic paper selection function, the selected contents being displayed on the liquid crystal display unit 138.

Keys 108 and 110 are used for selecting an equal magnification and a formal reduction/magnification. A key 118 and its display unit 117 are used for setting an automatic variable magnification mode and displaying the set mode. The contents set by these keys are displayed on the liquid crystal display unit 138.

Figure 4:
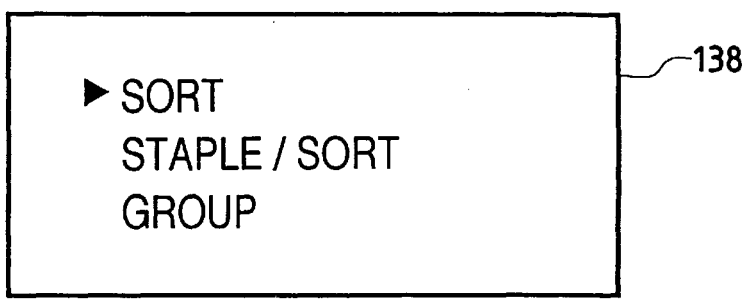
FIG. 4 is a diagram illustrating settings for sheet processing displayed on a liquid crystal panel 138.

A reduction layout key 120 is used for setting a copy mode in which a plurality of original images are synthesized and copied on a single sheet. The setting sequence thereof is displayed on the liquid crystal display unit 138. FIG. 4 is a diagram illustrating the sheet processing set contents displayed on the liquid crystal display unit 138.

Figure 5A:
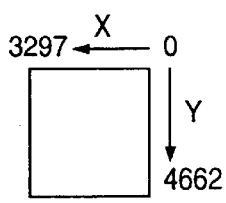
FIGS. 5A to 5G are diagrams illustrating a method of reading image data from an image memory and writing image data in the image memory 25.

FIGS. 5A to 5G are diagrams illustrating a method of reading/writing image data from/to the image memory 25. As shown in FIG. 5A, the image memory 25 has a storage capacity of 4663×3298 bits corresponding to an A4 size. The storage capacity may be increased. First, the method of storing original image in the image memory will be described with reference to FIGS. 5B and 5C.

Figure 5B:

FIG. 5B illustrates how an A4 original placed on the original support glass plate 2 is stored in the image memory 25. An original placed as at (B1) in FIG. 5B is sequentially read as indicated by arrows. For reading the first line, as illustrated at (B2) in FIG. 5B, an X-direction counter is set to an up-count and a Y-direction counter is set to an up-count. As the first line is read, the Y-direction counter counts up, and the image data is sequentially written starting from address (0, 0) toward address (0, 4662).

Next, as the second line is read, the X-direction counter counts up, and the image data is sequentially written from address (1, 0) to address (1, 4662). By sequentially reading the image data, it is written in the above manner toward address (3297, 4662).

Figure 5C:
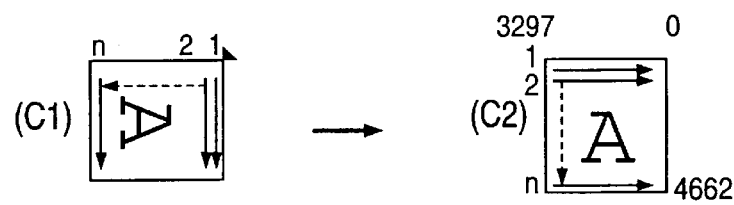

FIG. 5C illustrates how image data on an A4 original placed horizontally on the original support glass plate 2 is written in the image memory. The original placed as at (C1) in FIG. 5C is sequentially read in the directions indicated by arrows. For reading the first line, as illustrated at (C2) in FIG. 5C, the X-direction counter is set to a down-count and the Y-direction counter is set to an up-count. As the first line is read, the Y-direction counter counts up, and the image data is sequentially written starting from address (3297, 0) toward address (0, 0). Next, as the second line is read, the Y-direction counter counts up, and the image data is sequentially written from address (3297, 1) to address (0, 1). By sequentially reading the image data, it is written in the above manner toward address (0, 4662).

Next, the method of reading the image data written in the image memory by the method illustrated in FIGS. 5B and 5C will be described with reference to FIGS. 5D, 5E, 5F, and 5G.

Figure 5D:
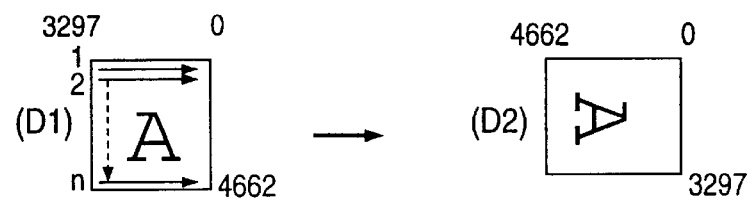

As shown in FIG. 5D, the first line of the stored image data is read starting from address (3297, 0) to address (0, 0) in the X-direction, by setting the X-direction counter to the down-count and the Y-direction counter to the up-count and by sequentially counting down the X-direction counter. Next, the Y-direction counter is counted up to read the second line from address (3279, 1) to address (0, 1). By sequentially reading the image data in the above manner, an image at (D2) shown in FIG. 5D can be printed out.

Figure 5E:
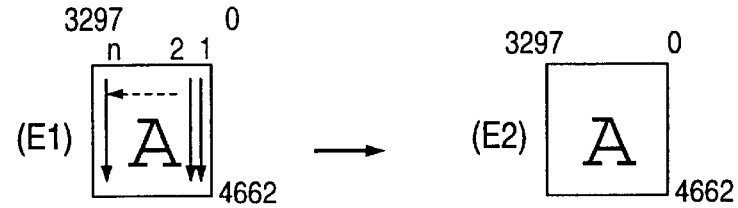

As shown in FIG. 5E, the first line of the stored image data is read starting from address (0, 0) to address (0, 4662) in the Y-direction, by setting the X-direction counter to the up-count and the Y-direction counter to the up-count and by sequentially counting up the X-direction counter. Next, the X-direction counter is counted up to read the second line from address (1, 0) to address (1, 4662). By sequentially reading the image data in the above manner, an image at (E2) shown in FIG. 5E can be printed out.

Figure 5F:
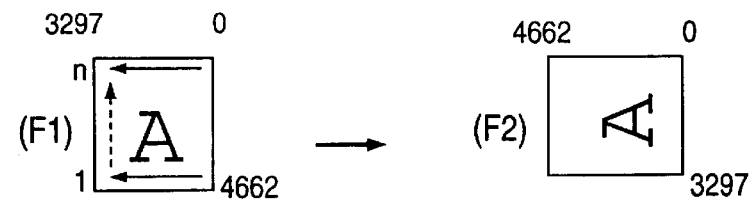

As shown in FIG. 5F, the image data is read starting from address (0, 4662) by setting the X-direction counter to the up-count and the Y-direction counter to the down-count, and the image at (F2) shown in FIG. 5F can be printed out.

Figure 5G:
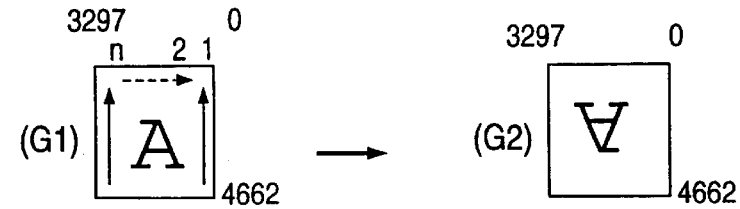

As shown in FIG. 5G, the image data is read starting from address (3297, 4662) by setting the X-direction counter to the down-count and the Y-direction counter to the down-count, and the image at (G2) shown in FIG. 5G can be printed out.

Therefore, if the original image of the vertical A4 shown at (B1) written in the method of FIG. 5B is read by the method of FIG. 5D, the original image can be rotated by 90 degrees in the clockwise direction, and if it is read by the method of FIG. 5E, it can be read without rotating it. If the original image of the horizontal A4 shown at (C1) written in the method of FIG. 5C is read by the method of FIG. 5D, the original image can be read without rotating it, and if it is read by the method 5E, it can be rotated by 270 degrees in the clockwise direction.

Similarly, for the vertical A4 original, the combination of the methods 5B and 5F can rotate the image by 270 degrees in the clockwise direction, and for the horizontal A4 original, the combination of the methods 5C and 5F can rotate the image by 180 degrees, and the combination of the methods 5C and 5G can rotate the image by 90 degrees in the clockwise direction. Both the vertical and horizontal originals can be read by rotating them by 0, 90, 180, or 270 degrees in the clockwise direction.

FIGS. 6A to 6D are diagrams illustrating the process of setting a reduction layout mode. As the reduction layout key 120 is depressed, the liquid crystal display unit 138 displays an original size input screen shown in FIG. 6A. A desired original size is set by moving a cursor by the control keys 131 to 135. After the original size is set, the liquid crystal display unit 138 displays a screen shown in FIG. 6B for setting the type of a layout and the number of originals. After the number of originals is set, the liquid crystal display unit 138 displays a screen shown in FIG. 6C for setting an output sheet. A desired output sheet is selected by the control keys 131 to 135. Lastly, the liquid crystal display unit 138 displays a screen shown in FIG. 6D for setting the type of an original. The above setting is controlled by the CPU circuit unit 27 and stored in RAM of the CPU circuit unit 27.

Figure 7B:
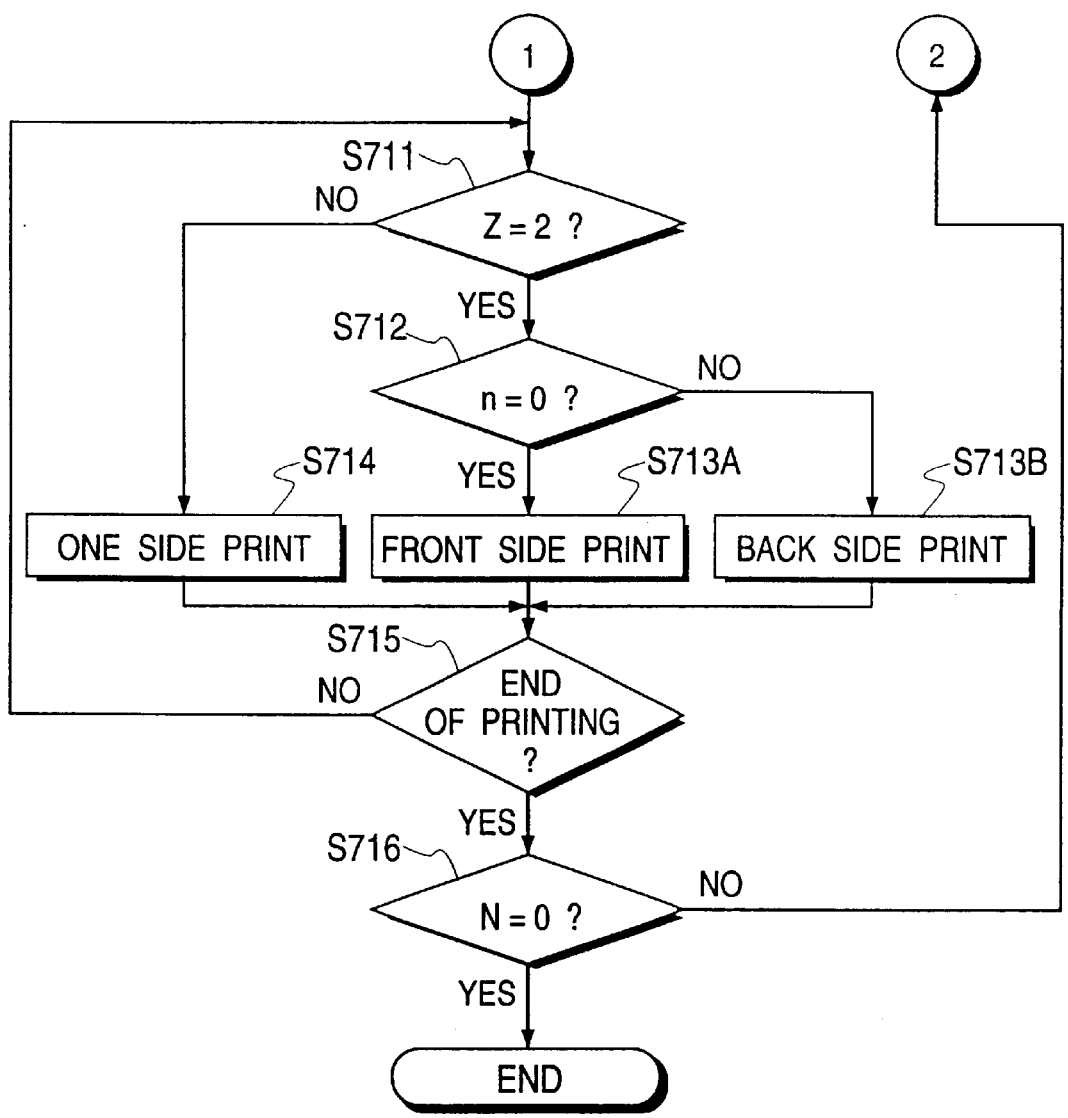
FIG. 7 which is composed of FIGS. 7A and 7B are flow charts illustrating a copy process routine in the reduction layout mode.

FIGS. 7A and 7B are flow charts illustrating the copy process routine in the reduction layout mode. First, the number N of originals is set (Step S701). If the number of originals is already known, the number is substituted for the original number N. If the automatic original number mode is set, the originals are counted by the original feed unit 1 during an idle feed, and the count is substituted for the original number N.

Other data is initialized (Step S702). Other data include the number L of reduced layout images on one side of a sheet, the number Z of sides on which images are formed, a horizontal length Px and a vertical length Py of a sheet, a shorter side length Pshort and a longer side length Plong determined from Px and Py, and a vertical length Oy and a horizontal length Ox of an original.

Figure 8:
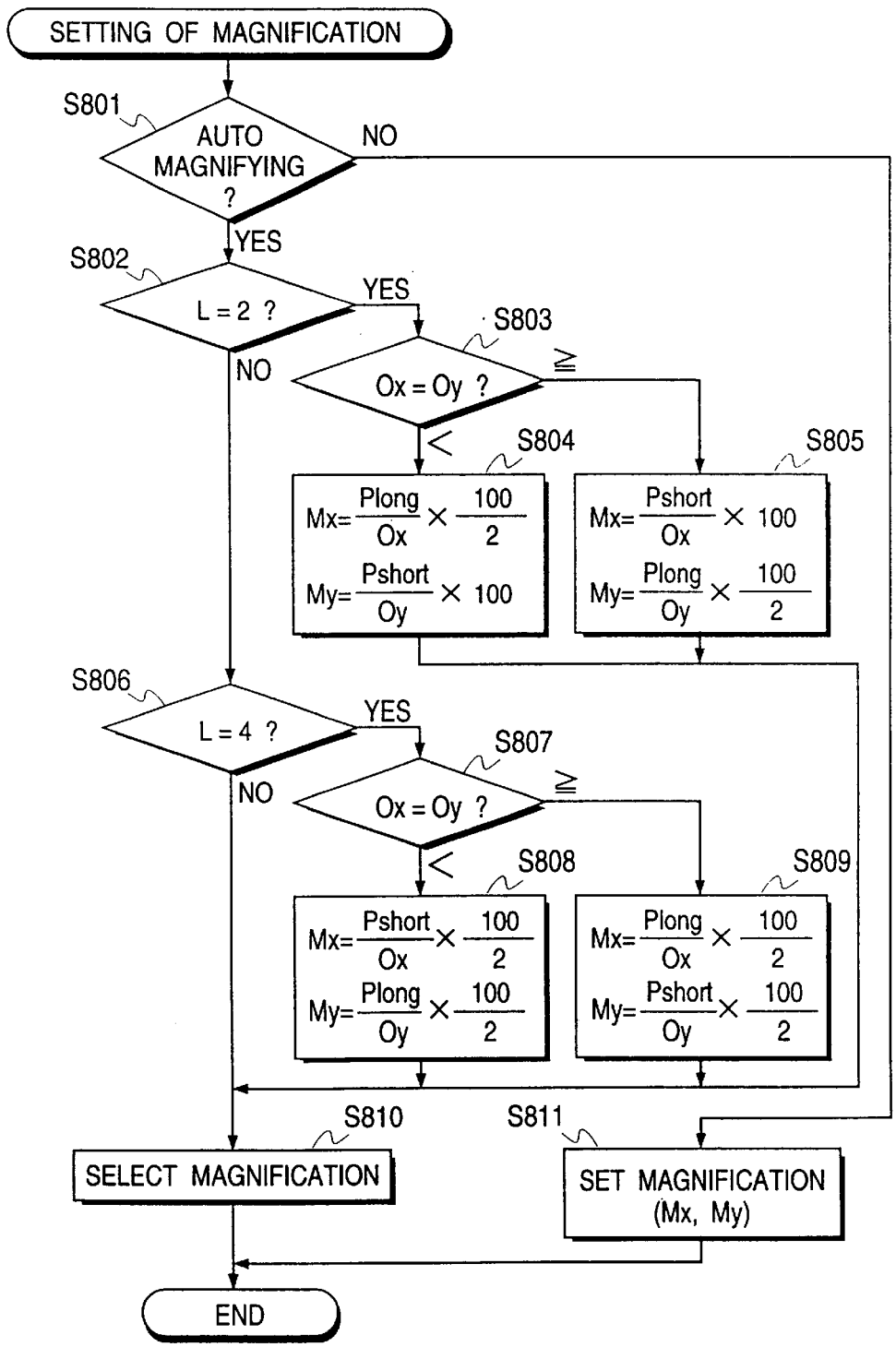
FIG. 8 is a flow chart illustrating a routine of setting a variable magnification.

Variable magnifications Mx and My are set (Step S703). FIG. 8 is a flow chart illustrating the routine of setting a variable magnification. It is first checked whether the automatic variable magnification mode is set (Step S801). If not set, the variable magnifications in the vertical and horizontal directions set on the operation unit 26 are inputted as the variable magnifications Mx and My (Step S811) to complete this routine.

If the automatic variable magnification mode is set, it is checked whether the reduction layout mode is a 2-layout (2-in-1) (Step S802). If not, it is checked whether the reduction layout mode is a 4-layout (4-in-1) (Step S806).

If the reduction layout is a 2-layout, the vertical and horizontal lengths Ox and Oy of an original are compared (Step S803). If the horizontal length Ox is equal to or longer than the vertical length Oy, i.e., if the original is horizontally long, the magnification Mx in the horizontal direction and the magnification My in the vertical direction are calculated from the equations (1) (Step S805).

$$Mx=(100 \times Pshort)/Ox$$
$$My=(100 \times Plong)/(2 \times Oy) \qquad (1)$$

If the vertical direction Oy of the original is longer at Step S803, i.e., if the original is vertically long, the magnification Mx in the horizontal direction and the magnification My in the vertical direction are calculated from the equations (2) (Step S804).

$$Mx=(100 \times Plong)/(2 \times Ox)$$
$$My=(100 \times Pshort)/Oy \qquad (2)$$

After the magnification Mx in the horizontal direction and the magnification My in the vertical direction are calculated, the magnification Mx in the horizontal direction is compared with the magnification My in the vertical direction and the smaller magnification is selected (Step S810) to complete this routine.

If the reduction layout is the 4-layout at Step 806, the vertical and horizontal lengths Ox and Oy of the original are compared (Step S807). If the horizontal length Ox is equal to or longer than the vertical length Oy, i.e., if the original is horizontally long, the magnification Mx in the horizontal direction and the magnification My in the vertical direction are calculated from the equations (3) (Step S809).

$$Mx=(100 \times Plong)/(2 \times Ox)$$
$$My=(100 \times Pshort)/(2 \times Oy) \qquad (3)$$

If the vertical length Oy of the original is longer, i.e., the original is vertically long, the magnification Mx in the horizontal direction and the magnification My in the vertical direction are calculated from the equations (4) (Step S808).

$$Mx=(100 \times Pshort)/(2 \times Ox)$$
$$My=(100 \times Plong)/(2 \times Oy) \qquad (4)$$

After the magnification Mx in the horizontal direction and the magnification My in the vertical direction are calculated, the magnification Mx in the horizontal direction is compared with the magnification My in the vertical direction and the smaller magnification is selected (Step S810) to complete this routine and return to Step S704.

Step S704 determines in accordance with the number Z of sides set at Step S702 which one of Steps S704A and S704B is to be performed.

At Step S704A, the original arranging position n' is determined from the equations (5) by using the number L of layouts and the number of originals N (% indicates division).

$$n=N\%2L, \; n'=n\%L \qquad (5)$$

Similarly at Step S704B, the original arranging position n' is determined from the equation (6) by using the number L of layouts and the number of originals N.

$$n'=N\%L \qquad (6)$$

The number L of layouts is compared, and in the case of the 2-layout the flow advances to Step S801 (Step S705) whereas in the case of the 4-layout the flow advances to Step S901 (Step S706).

Figure 9:
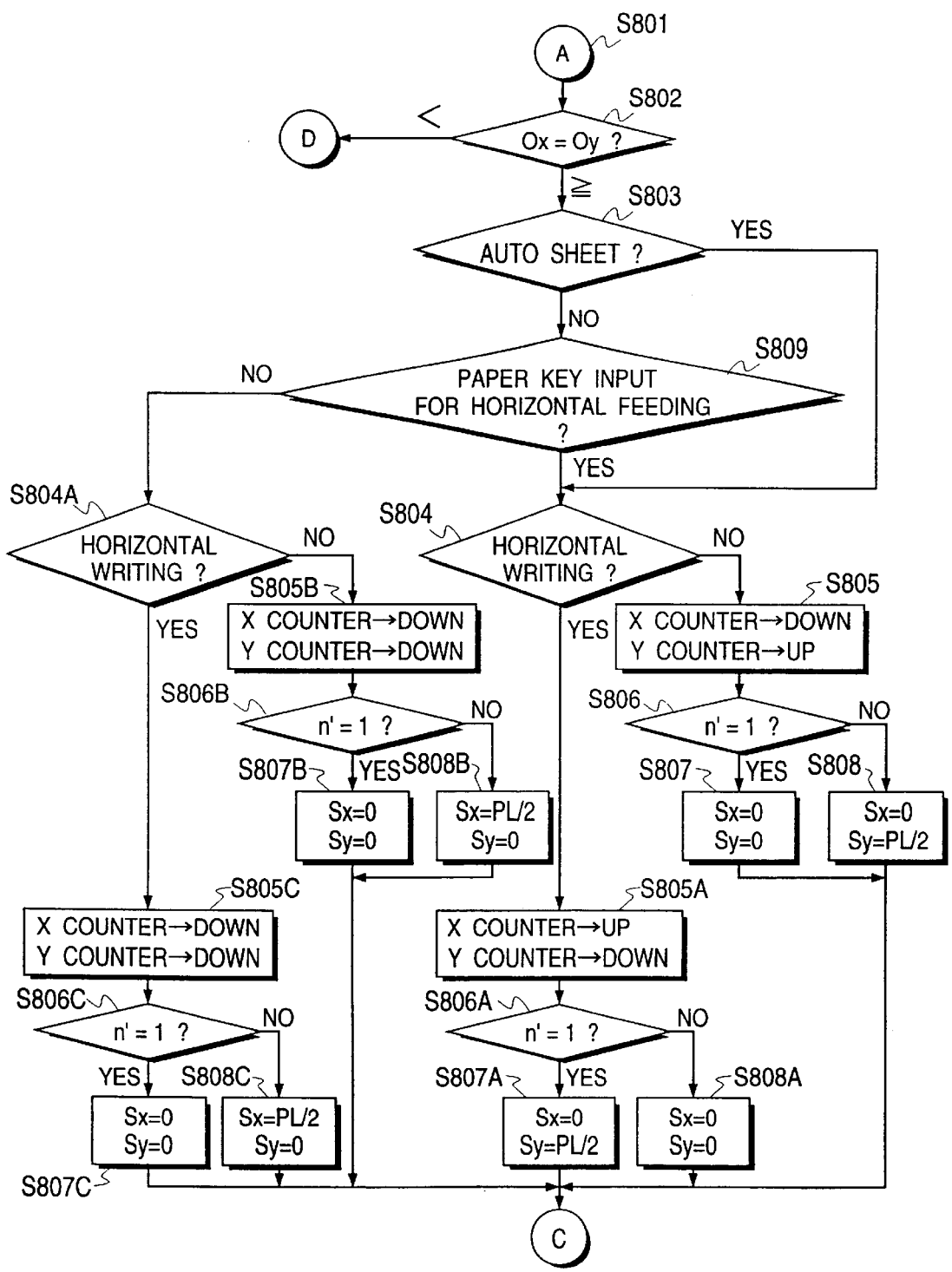
FIG. 9 is a flow chart illustrating a copy process in the 2-layout mode.
Figure 10:
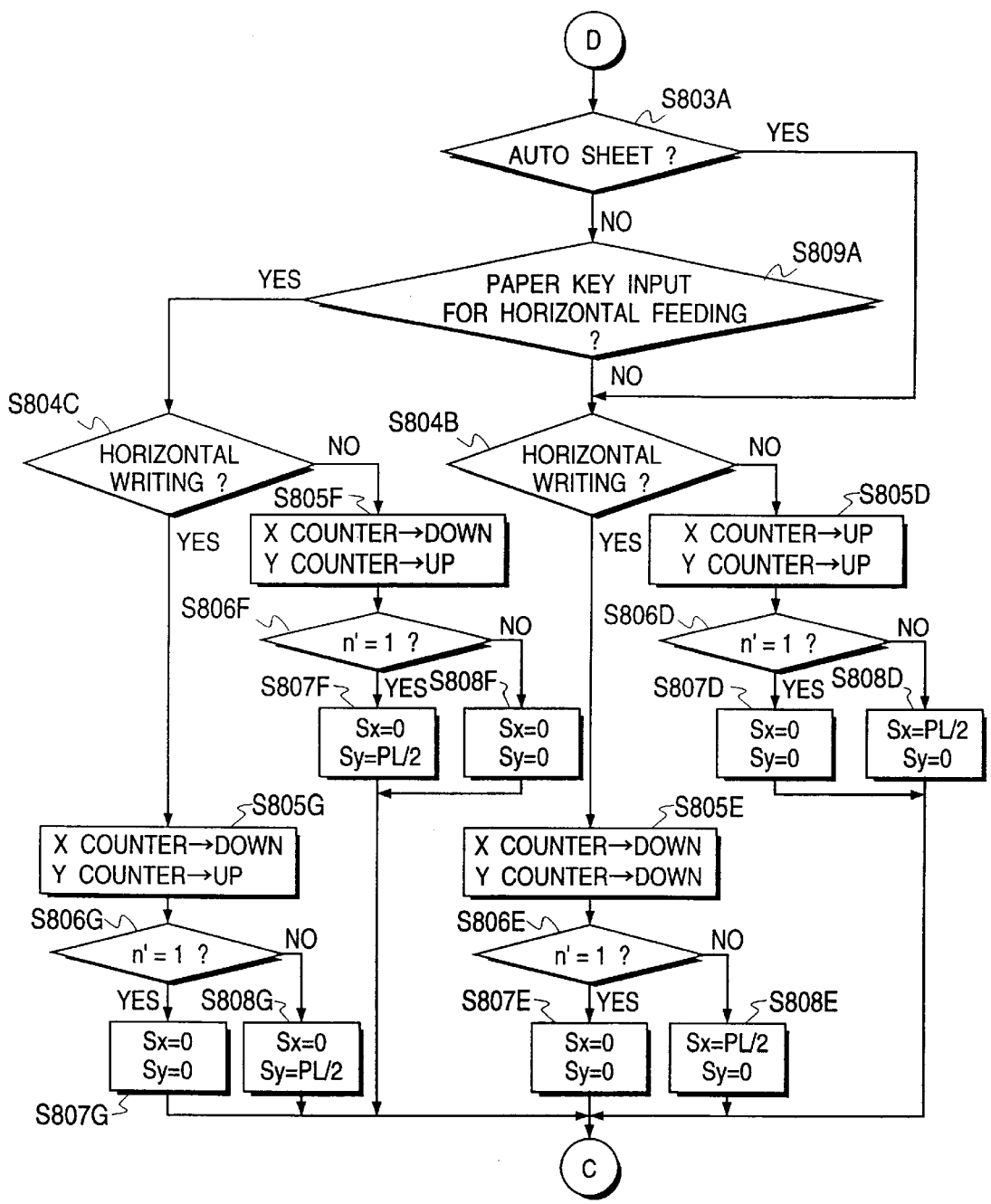
FIG. 10 is a flow chart illustrating the copy process in the 2-layout mode followed by the flow chart of FIG. 9.
Figure 11:
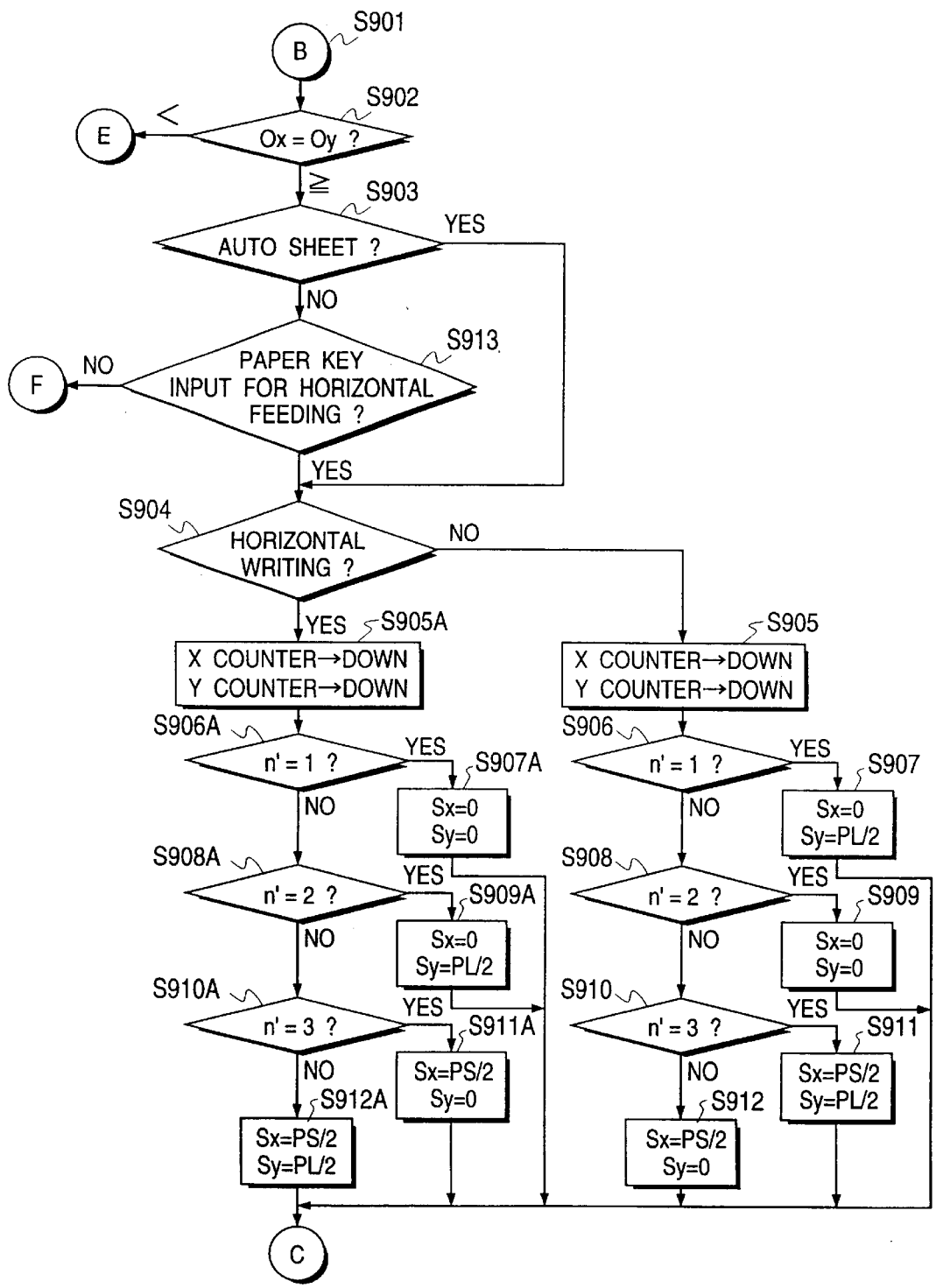
FIG. 11 is a flow chart illustrating a copy process in the 4-layout mode.
Figure 12:
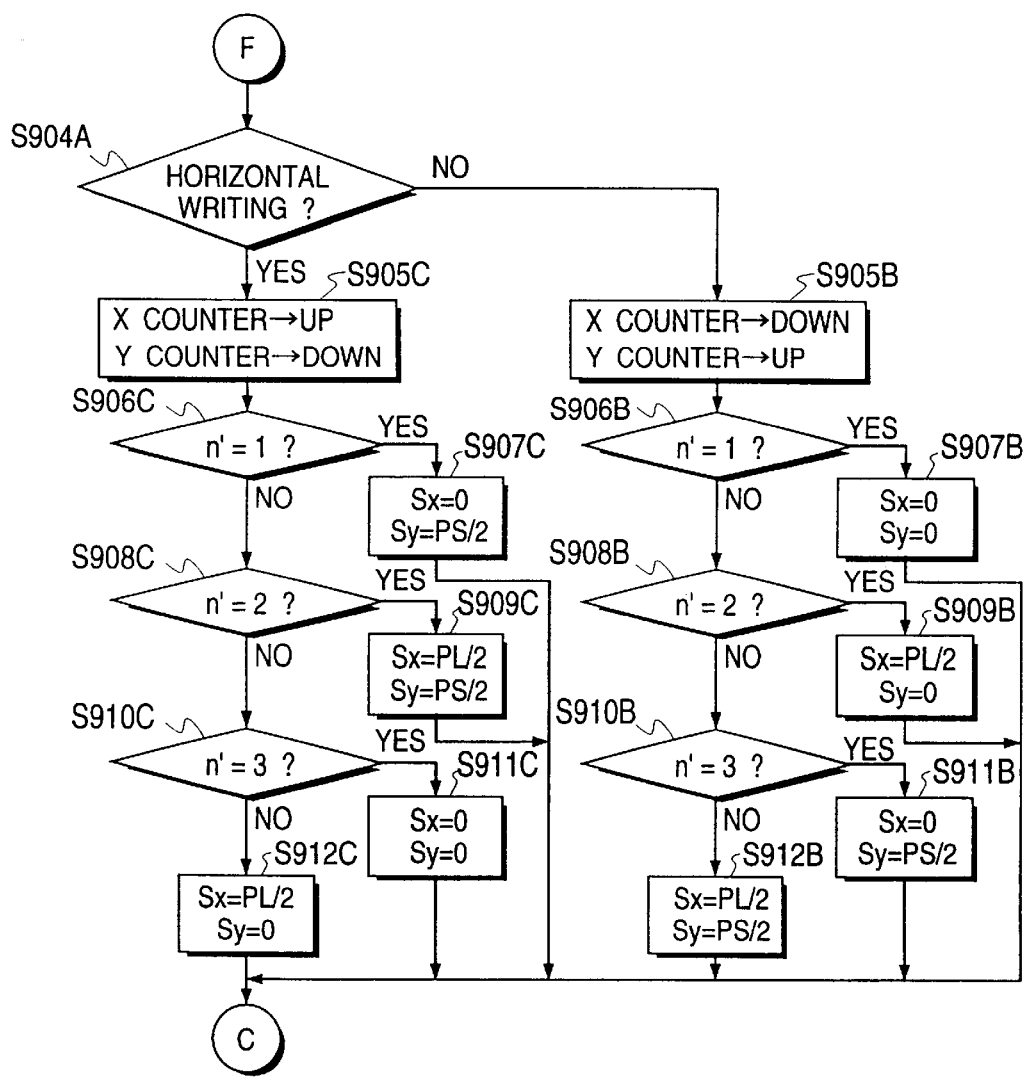
FIG. 12 is a flow chart illustrating the copy process in the 4-layout mode followed by the flow chart of FIG. 11.
Figure 13:
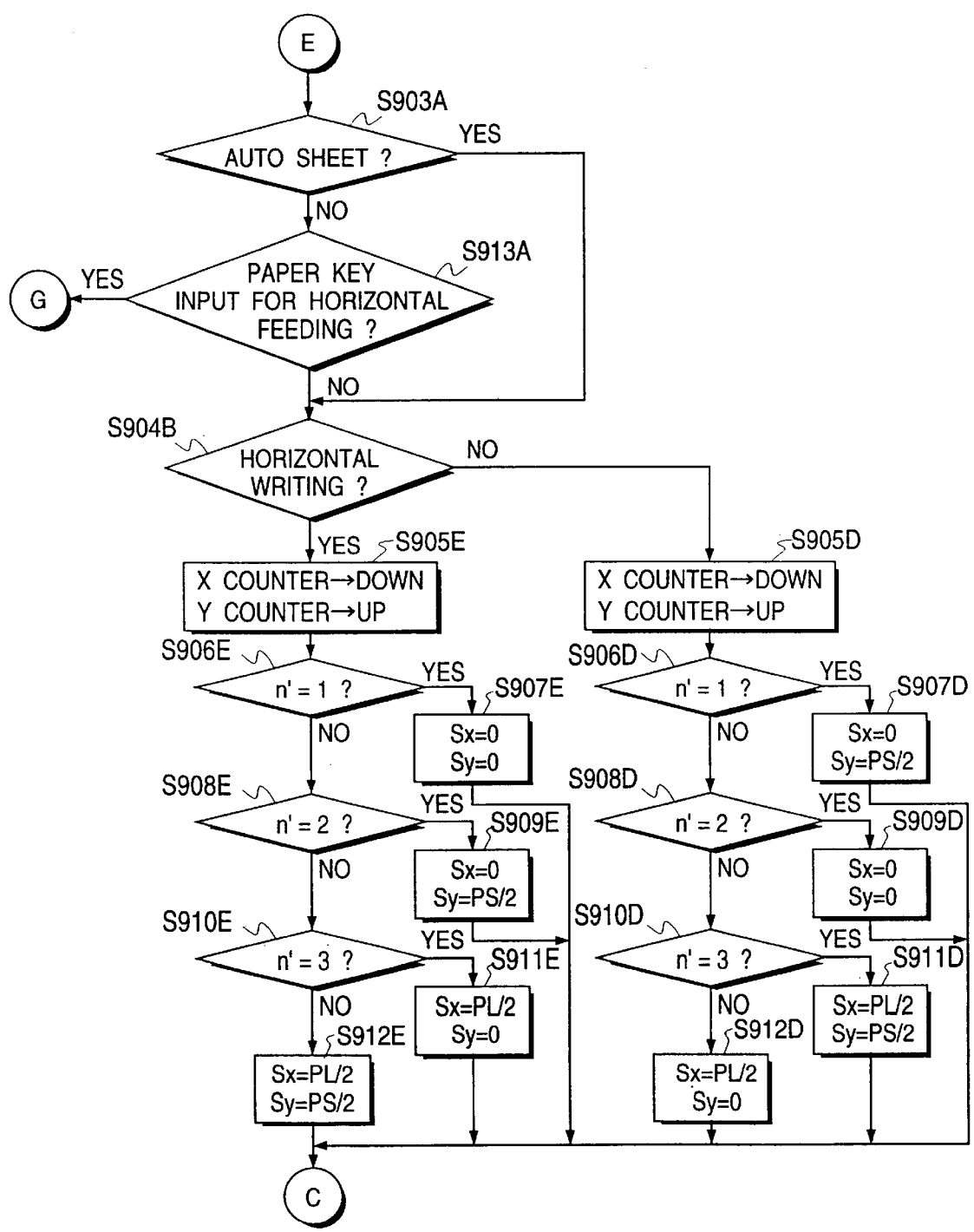
FIG. 13 is a flow chart illustrating the copy process in the 4-layout mode followed by the flow chart of FIG. 11.
Figure 14:
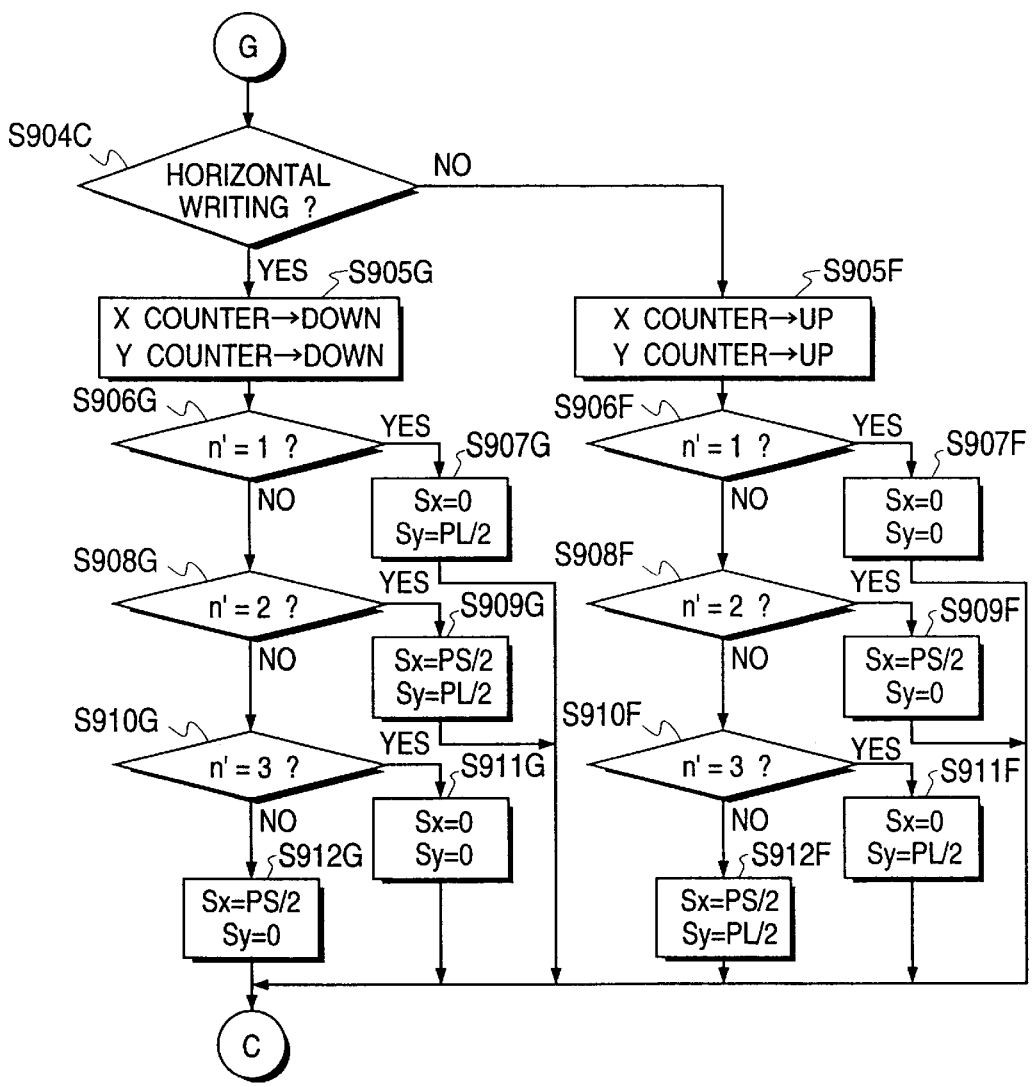
FIG. 14 is a flow chart illustrating the copy process in the 4-layout mode followed by the flow chart of FIG. 13.

FIGS. 9 and 10 are flow charts illustrating the copy process for the 2-layout. First, the horizontal and vertical lengths Ox and Oy of the original are compared to check whether the original is horizontally long or vertically long (Step S802). The operation will be described first wherein a horizontally long original with the vertical writing is used and an automatically selected paper sheet is transported in the horizontal feeding.

It is checked whether the sheet is an automatically selected sheet (Step S803). If the automatically selected sheet is used, a horizontal feeding sheet is selected for a horizontally long original, and a vertical feeding sheet is selected for a vertically long original. For the automatically selected sheet, a vertical feeding sheet may be used for the horizontally long original and a horizontal feeding sheet may be used for the vertically long original. If a sheet is already selected on the operation unit 26, this sheet is used.

It is checked whether the original selected as in FIG. 6D is a horizontal writing or a vertical writing (Step S804). The selection of the type of an original as in FIG. 6D is not necessarily required, and the vertical or horizontal writing may be always selected. This is preferable from the simplicity of user operation, if the user uses only the vertical writing or horizontal writing.

Figure 15:
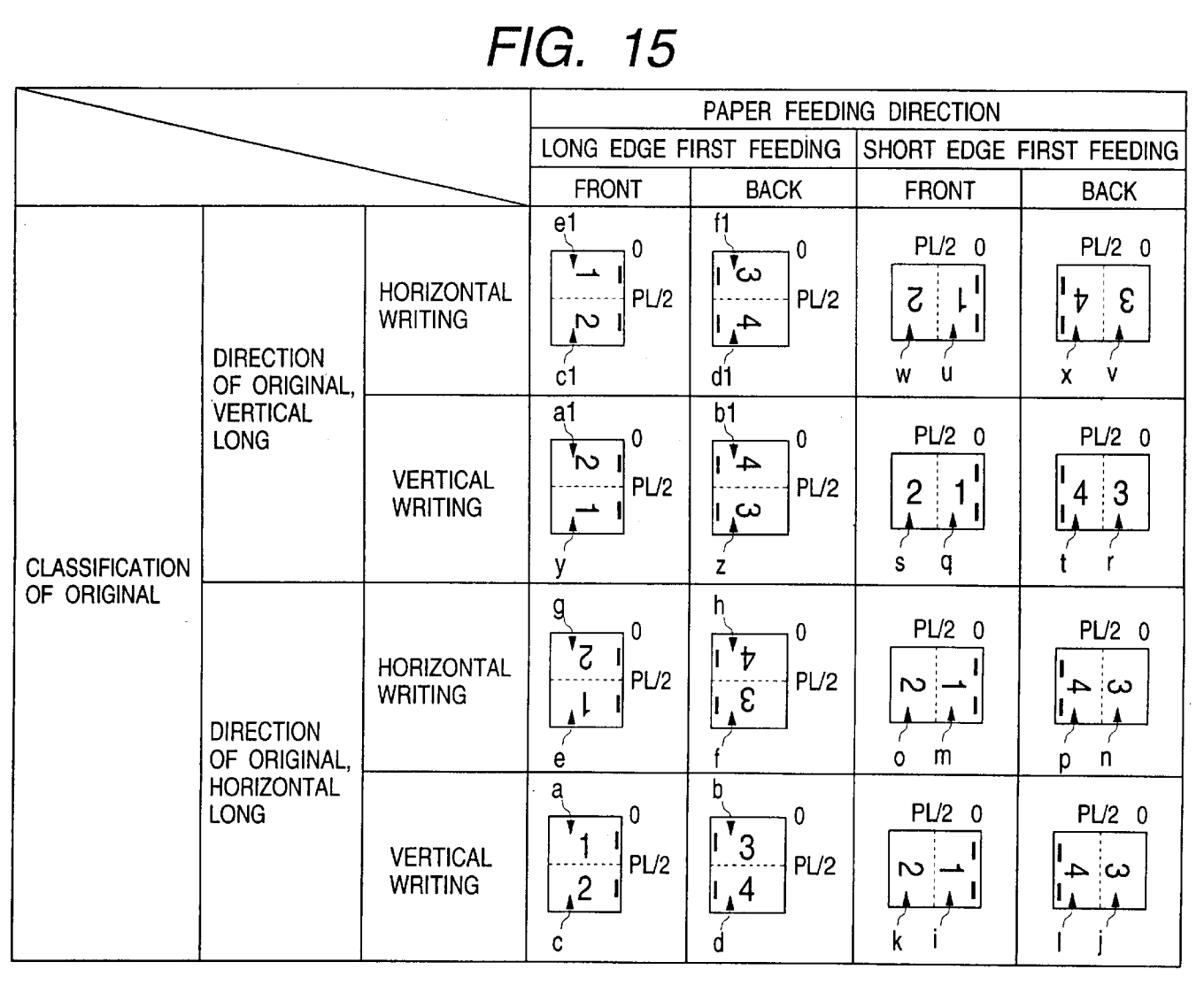

In accordance with the original arranging position n' calculated at Step S704A, the X- and Y-direction counters are counted up or down (Step S805). If n'=1 (Step S806), the image data is written by setting the write start position (Sx, Sy) to the upper right corner (0, 0) of the sheet (Step S807). As a result, the image data is processed so as to form the image with the positions and directions of "1" and "2" indicated by arrows a and b in FIG. 15. FIG. 15 shows the positions and directions of the recorded images. "1", "2", "3", "4" indicate the (4N−3)-th page, (4N−2)-th page, (4N−1)-th page, and 4N-th page, respectively, where N is a natural number.

If n'=0 (Step S808), the image data is processed so as to form the image with the positions and directions of "2" and "4" indicated by arrows c and d in FIG. 15. PL shown in FIGS. 9 and 10 indicates the longer side length of a sheet. After this routine, the flow returns to Step S707.

If Step S804 indicates the horizontal writing, similar processes are performed (Steps S805A, S806A). If n'=1 (Step S807A), the image data is processed so as to form the image with the positions and directions of "1" and "3" indicated by arrows e and f in FIG. 15. If n'=0 (Step S808A), the image data is processed so as to form the image with the positions and directions of "2" and "4" indicated by arrows g and h in FIG. 15.

If the sheet is not an automatically selected sheet at Step S803, the feeding direction is determined from the settings by the operation unit 26 (Step S809). If the operation unit 26 sets the vertical feeding, similar processes are performed (Steps S804A to S806B). If the direction is the vertical writing and n'=1 (Step S807B), the image data is processed so as to form the image with the positions and directions of "1" and "3" indicated by arrows i and j in FIG. 15. If n'=0 (Step S808B), the image data is processed so as to form the image with the positions and directions of "2" and "4" indicated by arrows k and l in FIG. 15.

If the direction is the horizontal writing and n'=1 (Step S807C), the image data is processed so as to form the image with the positions and directions of "1" and "3" indicated by arrows m and n in FIG. 15. If n'=0 (Step S808C), the image data is processed so as to form the image with the positions and directions of "2" and "4" indicated by arrows o and p in FIG. 15.

Similar processes are performed also when the original is judged to be vertically long at Step S802. Specifically, if the original is vertically long with the vertical writing and vertical feeding and n'=1 (Step S807D), then the image data is processed so as to form the image with the positions and directions of "1" and "3" indicated by arrows q and r in FIG. 15. If n'=0 (Step S808D), the image data is processed so as to form the image with the positions and directions of "2" and "4" indicated by arrows s and t in FIG. 15.

If the original is the horizontal writing and n'=1 (Step S807E), the image data is processed so as to form the image with the positions and directions of "1" and "3" indicated by arrows u and v in FIG. 15. If n'=0 (Step S808E), the image data is processed so as to form the image with the positions and directions of "2" and "4" indicated by arrows w and x in FIG. 15.

If the sheet is not an automatically selected sheet at Step S803A, the feeding direction is determined from the settings by the operation unit 26 (Step S809). If the operation unit 26 sets the vertical feeding, similar processes are performed (Steps S804C to S806F). If the direction is the vertical writing and n'=1 (Step S807F), the image data is processed so as to form the image with the positions and directions of "1" and "3" indicated by arrows y and z in FIG. 15. If n'=0 (Step S808F), the image data is processed so as to form the image with the positions and directions of "2" and "4" indicated by arrows a1 and b1 in FIG. 15.

If the direction is the horizontal writing and n'=1 (Step S807G), the image data is processed so as to form the image with the positions and directions of "2" and "4" indicated by arrows. c1 and d1 in FIG. 15. If n'=0 (Step S808G), the image data is processed so as to form the image with the positions and directions of "1" and "3" indicated by arrows e1 and f1 in FIG. 15.

With the above processing, if in the 2-in-1 mode and in the both side mode a sheet is horizontally fed, i.e., the longer side of the sheet is stapled, a both side copy is performed so as to copy "3" at the back side of "1" and copy "4" at the back side of "2". If a sheet is vertically fed, i.e., the shorter side of the sheet is stapled, a both side copy is performed so as to copy "4" at the back side of "1" and copy "3" at the back side of "2". The vertical and horizontal feeding and the longer and shorter side stapling are related to the physical constraints of the stapler/sorter 82, because the position at which the stapler/sorter 82 can staple is limited to the area near the sorter eject port.

With the above structure, each original position is changed depending upon whether the side at which two staples are used for fastening is a longer side or shorter side of a sheet. However, if the setting contents entered by an operator from the operation unit indicate that the fastening margin is formed along the longer side, the both side copy may be performed so as to copy "3" at the back side of "1" and copy "4" at the back side of "2". If the setting contents indicate that the fastening margin is formed along the shorter side, the both side copy may be performed so as to copy "4" at the back side of "1" and copy "3" at the back side of "2".

With the above structure, a copy operation has been described. Obviously, similar effects as above can be obtained also when an image formed by computers or the like is printed in the 2-in-1 mode and both side copy mode.

In both the shorter and longer side stapling modes and in the 2-in-1 both side copy mode, a book which does not give unnatural feelings when pages are turned over, can be formed.

FIGS. 11 to 14 are flow charts illustrating the copy process for the 4-layout. Similar to the 2-layout, first, it is checked whether the original is horizontally long or vertically long (Step S902). It is checked whether the sheet is an automatically selected sheet (Step S903). If the automatically selected sheet is used, a horizontal feeding sheet is selected for a horizontally long original, and a vertical feeding sheet is selected for a vertically long original. Similar to the 2-layout, for the automatically selected sheet, a vertical feeding sheet may be used for the horizontally long original and a horizontal feeding sheet may be used for the vertically long original. If a sheet is already selected on the operation unit 26, this sheet is used.

Next, similar to the 2-layout, it is checked whether the original is a horizontal writing or a vertical writing (Step S904). In accordance with the original arranging position n' calculated at Step S704A, the X- and Y-direction counters are counted up or down (Step S905). The image data is written by setting the write start position (Sx, Sy) to the upper right corner (0, 0) of the sheet. PS in FIGS. 11 to 14 indicates the shorter side length of a sheet.

Figure 16:
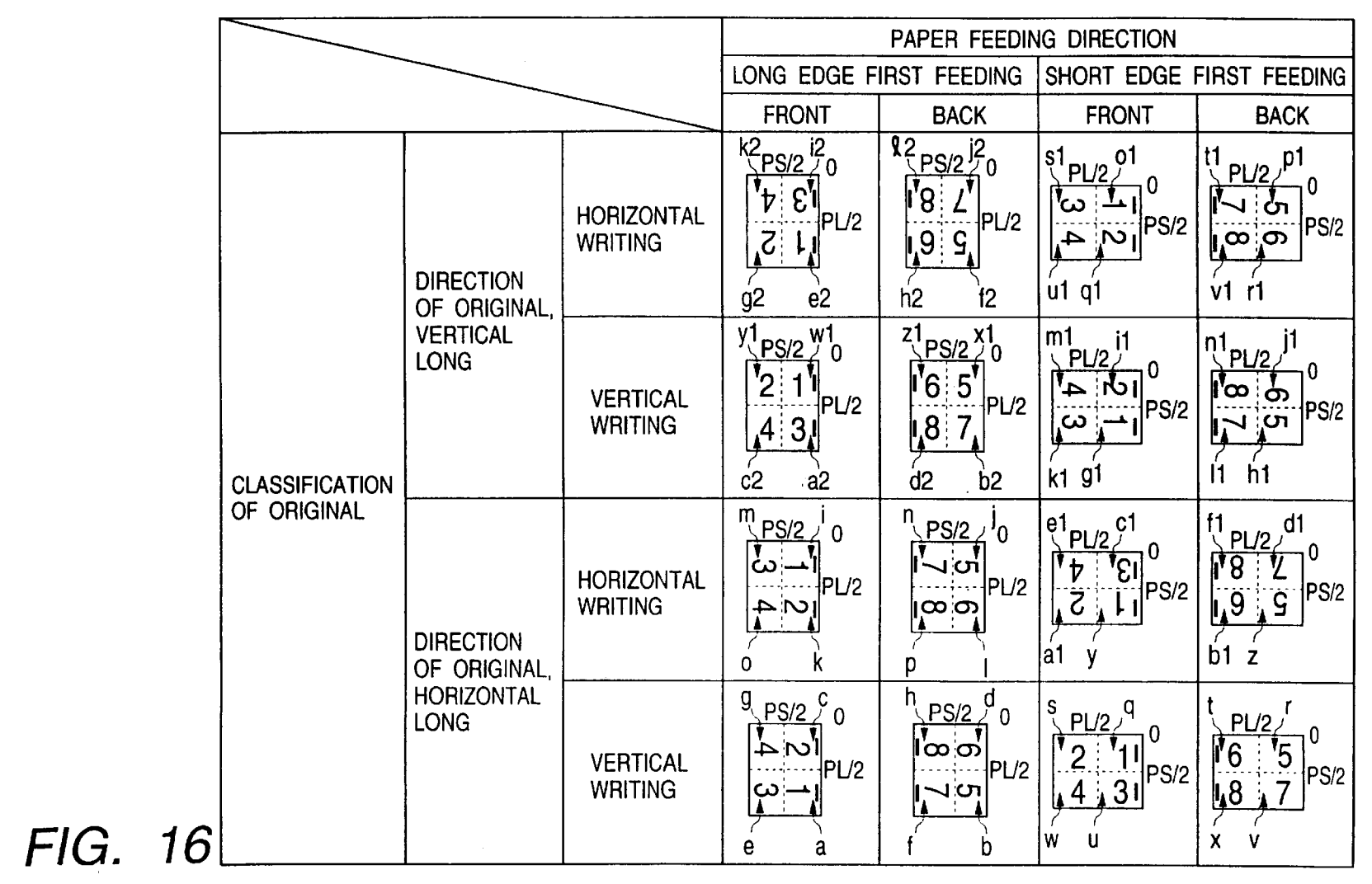

If the original is vertically written and long with the horizontal feeding, the image data is processed so as to form the images with the positions and directions of "1" and "5" at n'=1 indicated by arrows a and b in FIG. 16, the images with the positions and directions of "2" and "6" at n'=2 indicated by arrows c and d in FIG. 16, the images with the positions and directions of "3" and "7" at n'=3 indicated by arrows e and f in FIG. 16, and the images with the positions and directions of "4" and "8" at n'=0 indicated by arrows g and h in FIG. 16. After this routine is completed, the flow returns to Step S707 (Steps S906 to S912). "1", "2", "3", "4", "5", "6", "7", and "8" indicate the (8N−7)-th page, (8N−6)-th page, (8N−5)-th page, (8N−4)-th page, (8N−3)-th page, (8N−2)-th page, (8N−1)-th page, and 8N-th page, respectively, where N is a natural number.

For the horizontal writing, similar processes are performed (S905A). The image data is processed so as to form the images with the positions and directions of "1" and "5" at n'=1 indicated by arrows i and j in FIG. 16, the images with the positions and directions of "2" and "6" at n'=2 indicated by arrows k and l in FIG. 16, the images with the positions and directions of "3" and "7" at n'=3 indicated by arrows m and n in FIG. 16, and the images with the positions and directions of "4" and "8" at n'=0 indicated by arrows o and p in FIG. 16. After this routine is completed the flow returns to Step S707 (Steps S906A to S912A).

If the sheet is not an automatically selected sheet at Step S903, the feeding direction is determined from the settings by the operation unit 26 (Step S913). If the operation unit 26 sets the vertical feeding, similar processes are performed (Steps S904A to S905B). If the direction is the vertical writing, the image data is processed so as to form the images with the positions and directions of "1" and "5" at n'=1 indicated by arrows q and r in FIG. 16, the images with the positions and directions of "2" and "6" at n'=2 indicated by arrows s and t in FIG. 16, the images with the positions and directions of "3" and "7" at n'=3 indicated by arrows u and v in FIG. 16, and the images with the positions and directions of "4" and "8" at n'=0 indicated by arrows w and x in FIG. 16. After this routine is completed the flow returns to Step S707 (Steps S906B to S912B).

If the direction is the horizontal writing, the image data is processed so as to form the images with the positions and directions of "1" and "5" at n'=1 indicated by arrows y and z in FIG. 16, the images with the positions and directions of "2" and "6" at n'=2 indicated by arrows a1 and b1 in FIG. 16, the images with the positions and directions of "3" and "7" at n'=3 indicated by arrows c1 and d1 in FIG. 16, and the images with the positions and directions of "4" and "8" at n'=0 indicated by arrows e1 and f1 in FIG. 16. After this routine is completed the flow returns to Step S707 (Steps S906C to S912C).

Similar processes are performed also when the original is judged to be vertically long at Step S902. Specifically, if the original is vertically long with the vertical writing and vertical feeding, the image data is processed so as to form the images with the positions and directions of "1" and "5" at n'=1 indicated by arrows g1 and h1 in FIG. 16, the images with the positions and directions of "2" and "6" at n'=2 indicated by arrows i1 and j1 in FIG. 16, the images with the positions and directions of "3" and "7" at n'=3 indicated by arrows k1 and l1 in FIG. 16, and the images with the positions and directions of "4" and "8" at n'=0 indicated by arrows m1 and n1 in FIG. 16. After this routine is completed the flow returns to Step S707 (Steps S906D to S912D).

If the original is the horizontal writing, the image data is processed so as to form the images with the positions and directions of "1" and "5" at n'=1 indicated by arrows o1 and p1 in FIG. 16, the images with the positions and directions of "2" and "6" at n'=2 indicated by arrows q1 and r1 in FIG. 16, the images with the positions and directions of "3" and "7" at n'=3 indicated by arrows s1 and t1 in FIG. 16, and the images with the positions and directions of "4" and "8" at n'=0 indicated by arrows u1 and v1 in FIG. 16. After this routine is completed the flow returns to Step S707 (Steps S906E to S912E).

If the sheet is not an automatically selected sheet at Step S903A, the feeding direction is determined from the settings by the operation unit 26 (Step S913A). If the operation unit 26 sets the horizontal feeding, similar processes are performed (Steps S904C to S905F). If the direction is the vertical writing, the image data is processed so as to form the images with the positions and directions of "1" and "5" at n'=1 indicated by arrows w1 and x1 in FIG. 16, the images with the positions and directions of "2" and "6" at n'=2 indicated by arrows y1 and z1 in FIG. 16, the images with the positions and directions of "3" and "7" at n'=3 indicated by arrows a2 and b2 in FIG. 16, and the images with the positions and directions of "4" and "8" at n'=0 indicated by arrows c2 and d2 in FIG. 16. After this routine is completed the flow returns to Step S707 (Steps S906F to S912F).

If the direction is the horizontal writing, the image data is processed so as to form the images with the positions and directions of "1" and "5" at n'=1 indicated by arrows e2 and f2 in FIG. 16, the images with the positions and directions of "2" and "6" at n'=2 indicated by arrows g2 and h2 in FIG. 16, the images with the positions and directions of "3" and "7" at n'=3 indicated by arrows i2 and j2 in FIG. 16, and the images with the positions and directions of "4" and "8" at n'=0 indicated by arrows k2 and l2 in FIG. 16. After this routine is completed the flow returns to Step S707 (Steps S906G to S912G).

The positions and directions of images are determined from the table shown in FIG. 16. Even if the program shown in FIGS. 17 to 19 is used, the sheets with combined images can be smoothly read by a user like reading a general book similar to the case shown in FIG. 16. A plurality of tables may be used for allowing a user to select and deal with broad needs of the user. In contrast, for a user who does not write an original vertically in both the 2-layout and 4-layout cases, the positions and directions of images in the vertical writing mode are not necessarily required.

After the processes described above, the flow returns to the main routine. At Step S707, originals in the original automatic feeder unit 1 are sequentially fed one after another to the original support glass plate 2. The image of the original is read in accordance with the contents set by the operation unit, a variable magnification set at the previous process, a write start address of the image memory 25, and other necessary data (Step S708), and stored in the image memory 25.

The original arranging positions n' and n and the number N of originals are decremented by 1 (Step S709). It is checked whether the original arranging position n' is 0 or not (Step S710). If not 0, the flow returns to Step S705 to repeat similar processes.

If n'=0, image data stored in the image memory 25 is printed out at Steps S713A and S714A. For printing, the image data stored in the image memory 25 is read with or without rotation such as shown in FIGS. 5D to 5G, exposed and developed to transfer and fix the image to the sheet.

If it is judged to be Z=2 at Step S711 and not to be n=0 at Step S712, the back side of the sheet is printed at Step S713B. The sheet with the printed image on the front side is reversed by the reverse flapper 83 and stacked on the intermediate tray 84. If it is judged at Step S711 that Z is not 2, then the sheet is ejected out with one side printed.

It is judged whether prints equal to the number as designated by the operation unit 26 have been completed (Step S715). If not completed, the flow returns to Step S711 to repeat the print operation at Step S713 or S714.

If the print operation has been completed, it is judged at Step S716 whether the number N of originals is 0 or not. If not, the flow returns to Step S704 to repeat similar operations as above.

Figure 20:
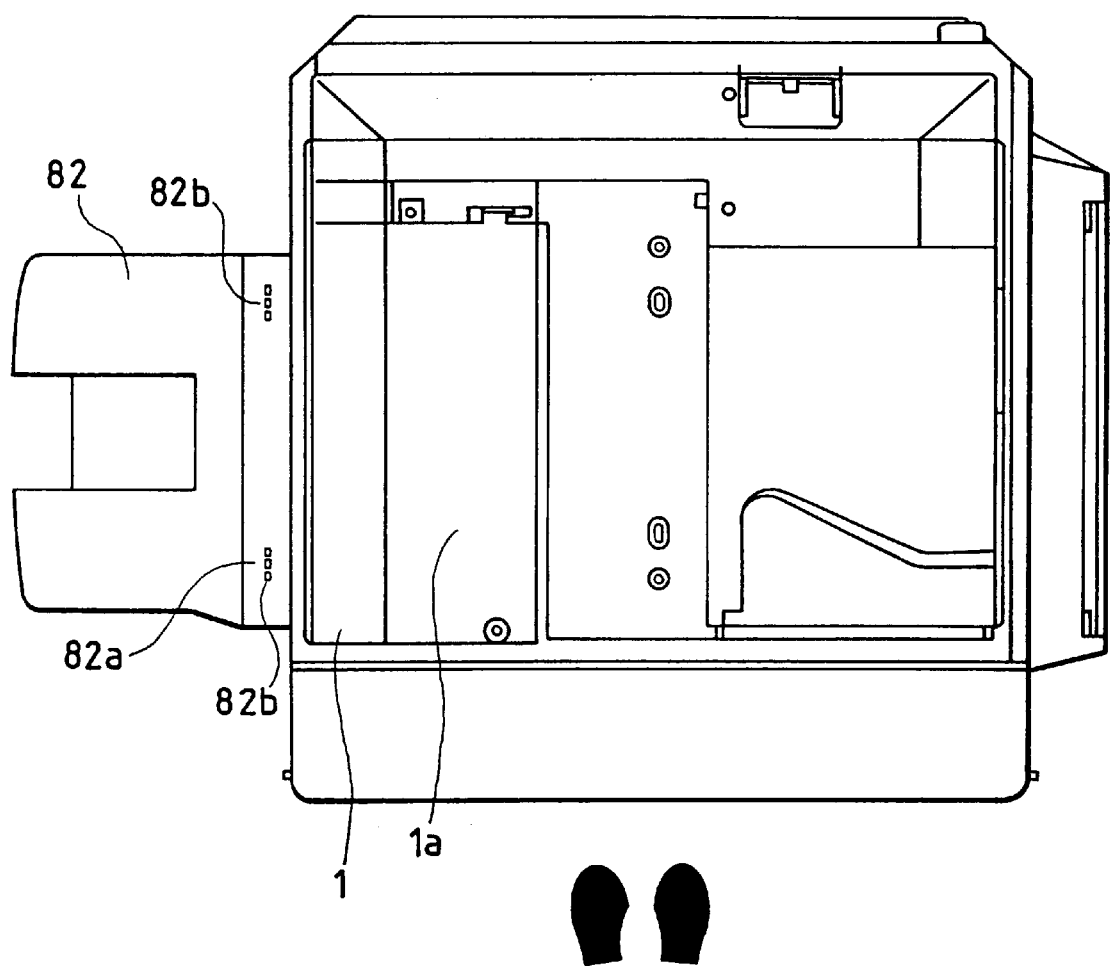
FIG. 20 is a plan view showing an image forming apparatus.
Figure 21:
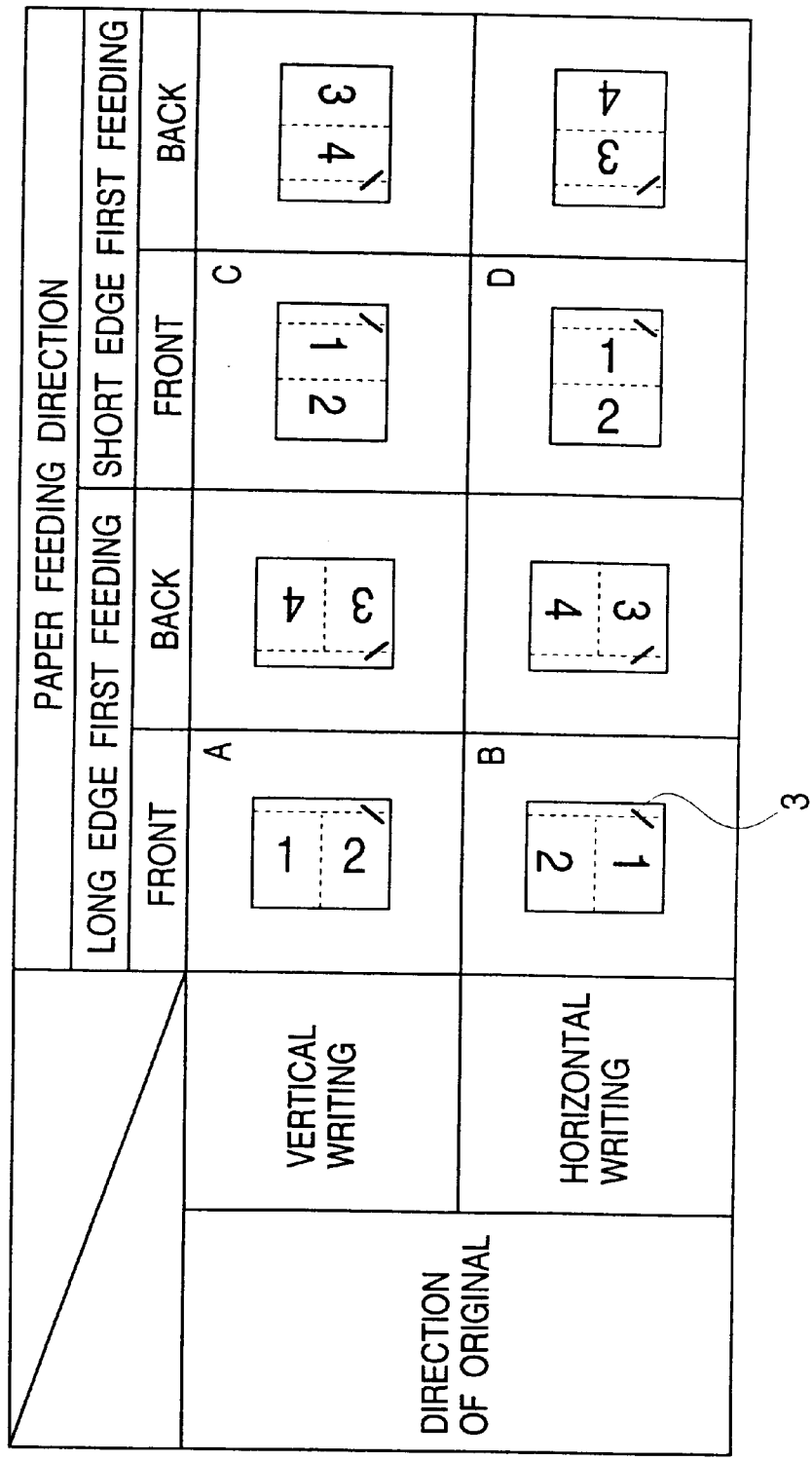
FIG. 21 is a diagram illustrating the positional relationship of images of originals formed on the front and back sides of each sheet in the 2-in-1 mode.
Figure 22:
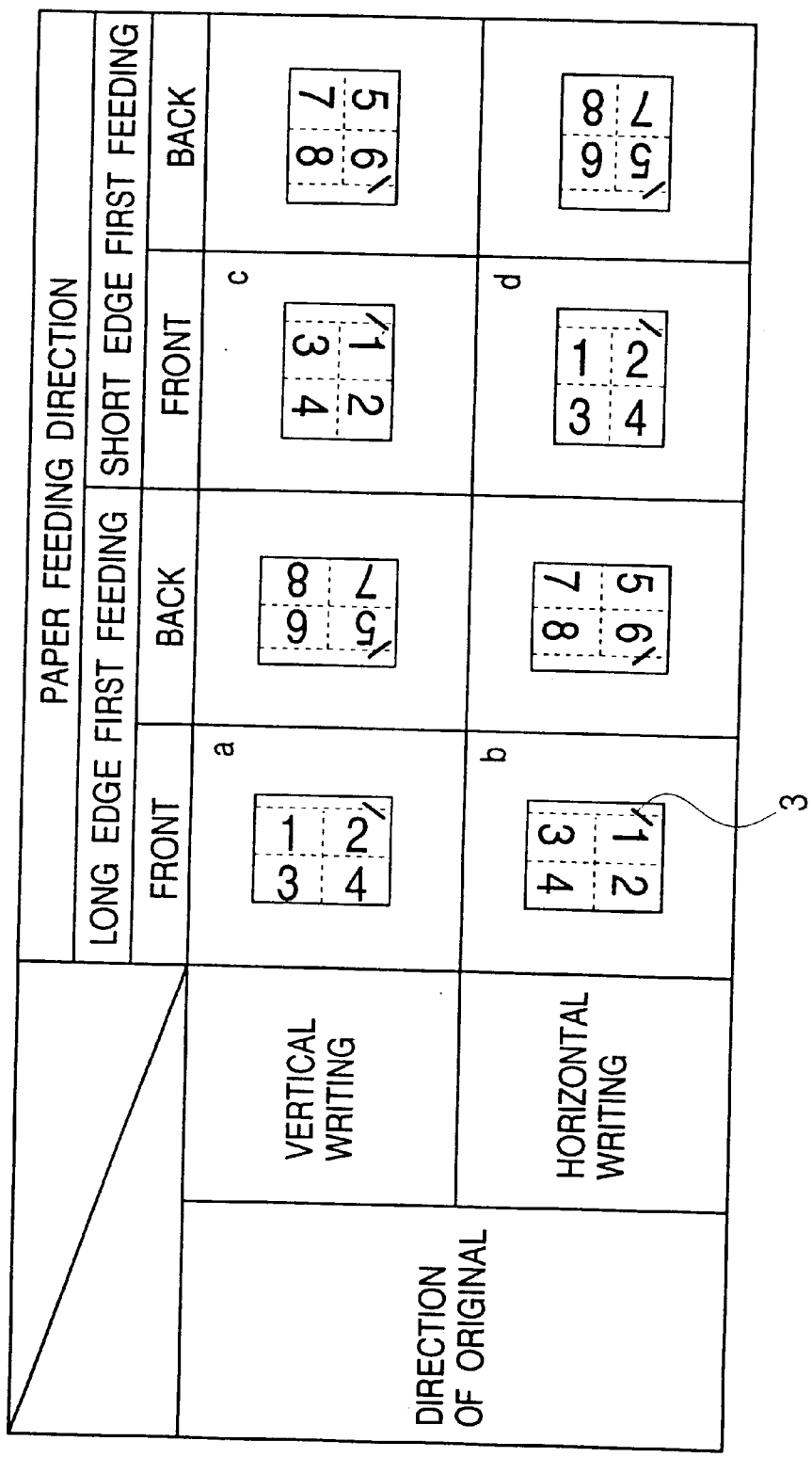
FIG. 22 is a diagram illustrating the positional relationship of images of originals formed on the front and back sides of each sheet in the 4-in-1 mode.

Thereafter, if the stapler/sorter was selected at the process shown in FIG. 4, the stapler 82a fastens two staples at the positions indicated at 82b in FIG. 20. FIG. 20 is a plan view of the image forming apparatus.

With the above processing, in the 4-in-1 mode and in the both side mode wherein "1", "2", "3", and "4" are disposed upper left, upper right, lower left, and lower right, if the longer side of the sheet is to be stapled (i.e., if the sheet is horizontally fed) and the direction of the original is vertically long, a both side copy is performed so as to copy "6" at the back side of "1", to copy "5" at the back side of "2", to copy "8" at the back side of "3", and to copy "7" at the back side of "4". If the shorter side of the sheet is to be stapled (i.e., if the sheet is vertically fed) and the direction of the original is horizontally long, a both side copy similar to the above arrangement is performed.

If the longer side of the sheet is to be stapled (i.e., if the sheet is horizontally fed) and the direction of the original is horizontally long, a both side copy is performed so as to copy "7" at the back side of "1", to copy "8" at the back side of "2", to copy "5" at the back side of "3", and to copy "6"

at the back side of "4". If the shorter side of the sheet is to be stapled (i.e., if the sheet is vertically fed) and the direction of the original is vertically long, a both side copy similar to the above arrangement is performed.

In the 4-in-1 mode and in the both side mode wherein "1", "2", "3", and "4" are disposed upper left, upper right, lower left, and lower right, if the longer side of the sheet is to be stapled (i.e., if the sheet is horizontally fed) and the direction of the original is vertically long, a both side copy is performed so as to copy at "7" at the back side of "1", to copy "8" at the back side of "2", to copy "5" at the back side of "3", and to copy "6" at the back side of "4". If the shorter side of the sheet is to be stapled (i.e., if the sheet is vertically fed) and the direction of the original is horizontally long, a both side copy similar to the above arrangement is performed.

If the longer side of the sheet is to be stapled (i.e., if the sheet is horizontally fed) and the direction of the original is horizontally long, a both side copy is performed so as to copy at "6" at the back side of "1", to copy "5" at the back side of "2", to copy "8" at the back side of "3", and to copy "7" at the back side of "4". If the shorter side of the sheet is to be stapled (i.e., if the sheet is vertically fed) and the direction of the original is vertically long, a both side copy similar to the above arrangement is performed.

The vertically long original is also called a portrait, and the horizontally long original is also called a landscape. The information on the portrait/landscape may be discriminated by the direction of setting the original or by an input by the operator from the operation unit.

With the above structure, a copy operation has been described. Obviously, similar effects as above can be obtained also when an image formed by computers or the like is printed in the 4-in-1 mode and both side copy mode.

In all the shorter and longer side stapling modes and portrait/landscape modes and in the 4-in-1 both side copy mode, a book which does not give unnatural feelings when pages are turned over, can be formed.

As described so far, according to the image forming apparatus of this embodiment, two staples are fastened after the 2-in-1 or 4-in-1 both side copy in accordance with the directions and positions of original images to be disposed. Therefore, the stapled sheets can be smoothly read by a user like reading a general book, irrespective of whether the originals are vertically or horizontally written.

What is claimed is:

1. A method for determining arrangement locations of plural images to be formed on the back side of a sheet, in a case where plural images of four pages (8N−7)-th, (8N−6)-th, (8N−5)-th, and (8N−4)-th pages are formed respectively at upper left, upper right, lower left, and lower right of the front side of the sheet, said method comprising:

a step of determining the arrangement locations of the plural images to be formed on the back side of the sheet, in a first mode of fastening or to fasten a longer side of the sheet and in the case of a portrait image or in a second mode of fastening or to fasten a shorter side of the sheet and in the case of a landscape image, so as to locate images of (8N−2)-th, (8N−3)-th, 8N-th, and (8N−1)-th pages respectively at the back sides of images of (8N−7)-th, (8N−6)-th, (8N−5)-th, and (8N−4)-th pages; and a step of determining the arrangement locations of the plural images to be formed on the back side of the sheet, in said first mode and in the case of a landscape image or in said second mode and in the case of a portrait image, so as to locate images of (8N−1)-th, 8N-th, (8N−3)-th, and (8N−2)-th pages respectively at the back sides of images of (8N−7)-th, (8N−6)-th, (8N−5)-th, and (8N−4)-th pages.

2. A method for determining arrangement locations of plural images to be formed on the back side of a sheet, in a case where plural images of four pages, i.e., (8N−7)-th, (8N−6)-th, (8N−5)-th, and (8N−4)-th pages are formed respectively at upper left, lower left, upper right, and lower right of the front side of the sheet, said method comprising:

a step of determining the arrangement locations of the plural images to be formed on the back side of the sheet, in a first mode of fastening or to fasten a longer side of the sheet and in the case of a portrait image or in a second mode of fastening or to fasten a shorter side of the sheet and in the case of a landscape image, so as to locate images of (8N−1)-th, 8N-th, (8N−3)-th, and (8N−2)-th pages respectively at the back of images of (8N−7)-th, (8N−6)-th, (8N−5)-th, and (8N−4)-th pages; and a step of determining the arrangement locations of the plural images to be formed on the back side of the sheet, in said first mode and in the case of a landscape image or in said second mode and in the case of a portrait image, so as to locate images of (8N−2)-th, (8N−3)-th, 8N-th, and (8N−1)-th pages respectively at the back sides of images of (8N−7)-th, (8N−6)-th, (8N−5)-th, and (8N−4)-th pages.

3. A method for determining arrangement locations of plural images to be formed on the back side of a sheet, in a case where plural portrait images of four pages, i.e., (8N−7)-th, (8N−6)-th, (8N−5)-th, and (8N−4)-th pages are formed respectively at upper left, upper right, lower left, and lower right of the front side of the sheet, said method comprising:

a step of determining the arrangement locations of the plural images to be formed on the back side of the sheet, in a first mode of fastening or to fasten a longer side of the sheet, so as to locate images of (8N−2)-th, (8N−3)-th, 8N-th, and (8N−1)-th pages respectively at the back sides of images of (8N−7)-th, (8N−6)-th, (8N−5)-th, and (8N−4)-th pages; and a step of determining the arrangement locations of the plural images to be formed on the back side of the sheet, in a second mode of fastening or to fasten a shorter side of the sheet, so as to locate images of (8N−1)-th, 8N-th, (8N−3)-th, and (8N−2)-th pages respectively at the back sides of images of (8N−7)-th, (8N−6)-th, (8N−5)-th, and (8N−4)-th pages.

4. A method for determining arrangement locations of plural images to be formed on the back side of a sheet, in a case where plural portrait images of four pages, i.e., (8N−7)-th, (8N−6)-th, (8N−5)-th, and (8N−4)-th pages are formed respectively at upper left, lower left, upper right, and lower right of the front side of the sheet, said method comprising:

a step of determining the arrangement locations of the plural images to be formed on the back side of the sheet, in a first mode of fastening or to fasten a longer side of the sheet, so as to locate images of (8N−1)-th, 8N-th, (8N−3)-th, and (8N−2)-th pages respectively at the back sides of images of (8N−7)-th, (8N−6)-th, (8N−5)-th, and (8N−4)-th pages; and a step of determining the arrangement locations of the plural images to be formed on the back side of the sheet, in a second mode of fastening or to fasten a shorter side of the sheet, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages.

5. A method for determining arrangement locations of plural images to be formed on the back side of a sheet, in a case where plural landscape images of four pages, i.e., (8N–7)-th, (8N–6)-th, (8N–5)-th, and (8N–4)-th pages are formed respectively at upper left, upper right, lower left, and lower right of the front side of the sheet, said method comprising:

a step of determining the arrangement locations of the plural images to be formed on the back side of the sheet, in a second mode of fastening or to fasten a shorter side of the sheet, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages; and a step of determining the arrangement locations of the plural images to be formed on the back side of the sheet, in a first mode of fastening or to fasten a longer side of the sheet, so as to locate images of (8N–1)-th, 8N-th, (8N–3)-th, and (8N–2)-th pages respectively at the back sides of images of (8N–7)-th, (8N–6)-th, (8N–5)-th, and (8N–4)-th pages.

6. A method for determining arrangement locations of plural images to be formed on the back side of a sheet, in a case where plural landscape images of four pages, i.e., (8N–7)-th, (8N–6)-th, (8N–5)-th, and (8N–4)-th pages are formed respectively at upper left, lower left, upper right, and lower right of the front side of the sheet, said method comprising:

a step of determining the arrangement locations of the plural images to be formed on the back side of the sheet, in a second mode of fastening or to fasten a shorter side of the sheet, so as to locate images of (8N–1)-th, 8N-th, (8N–3)-th, and (8N–2)-th pages respectively at the back sides of images of (8N–7)-th, (8N–6)-th, (8N–5)-th, and (8N–4)-th pages; and a step of determining the arrangement locations of the plural images to be formed on the back side of the sheet, in a first mode of fastening or to fasten a longer side of the sheet, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages.

7. A method for determining arrangement locations of plural images to be formed on the back side of a sheet, in a case where plural images of four pages, i.e., (8N–7)-th, (8N–6)-th, (8N–5)-th, and (8N–4)-th pages are formed respectively at upper left, upper right, lower left, and lower right of the front side of the sheet which is carried in such a state as its longer side is leading, said method comprising:

a step of determining the arrangement locations of the plural images to be formed on the back side of the sheet, the case of a portrait image, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages; and a step of determining the arrangement locations of the plural images to be formed on the back side of the sheet, in the case of a landscape image, so as to locate images of (8N–1)-th, 8N-th, (8N–3)-th, and (8N–2)-th pages respectively at the back sides of (8N–7)-th, (8N–6)-th, (8N–5)-th, and (8N–4)-th pages.

8. A method for determining arrangement locations of plural images to be formed on the back side of a sheet, in a case where plural images of four pages, i.e., (8N–7)-th, (8N–6)-th, (8N–5)-th, and (8N–4)-th pages are formed respectively at upper left, lower left, upper right, and lower right of the front side of the sheet which is carried in such a state as its longer side is leading, said method comprising:

a step of determining the arrangement locations of the plural images to be formed on the back side of the sheet, in the case of a portrait image, so as to locate images of (8N–1)-th, 8N-th, (8N–3)-th, and (8N–2)-th pages respectively at the back sides of images of (8N–7)-th, (8N–6)-th, (8N–5)-th, and (8N–4)-th pages; and a step of determining the arrangement locations of the plural images to be formed on the back side of the sheet, in the case of a landscape image, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages.

9. A method for determining arrangement locations of plural images to be formed on the back side of a sheet, in a case where plural images of four pages, i.e., (8N–7)-th, (8N–6)-th, (8N–5)-th, and (8N–4)-th pages are formed respectively at upper left, upper right, lower left, and lower right of the front side of the sheet which is carried in such a state as its shorter side is leading, said method comprising:

a step of determining the arrangement locations of the plural images to be formed on the back side of the sheet, in the case of a landscape image, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages; and a step of determining the arrangement locations of the plural images to be formed on the back side of the sheet, in the case of a portrait image, so as to locate images of (8N–1)-th, 8N-th, (8N–3)-th, and (8N–2)-th pages respectively at the sides of images of (8N–7)-th, (8N–6)-th, (8N–5)-th, and (8N–4)-th pages.

10. A method for determining arrangement locations of plural images to be formed on the back side of a sheet, in a case where plural images of four pages, i.e., (8N–7)-th, (8N–6)-th, (8N–5)-th, and (8N–4)-th pages are formed respectively at upper left, lower left, upper right, and lower right of the front side of the sheet which is carried in such a state as its shorter side is leading, said method comprising:

a step of determining the arrangement locations of the plural images to be formed on the back side of the sheet, in the case of a landscape image, so as to locate images of (8N–1)-th, 8N-th, (8N–3)-th, and (8N–2)-th pages respectively at the back sides of images of (8N–7)-th, (8N–6)-th, (8N–5)-th, and (8N–4)-th pages; and a step of determining the arrangement locations of the plural images to be formed on the back side of the sheet, in the case of a portrait image, so as to locate images of (8N–2)-th, (8N–3)-th, 8N-th, and (8N–1)-th pages respectively at the back sides of images of (8N–7)-th, (8N–6)-th, (8N–5)-th, and (8N–4)-th pages.

* * * * *

UNITED STATES PATENT AND TRADEMARK OFFICE
CERTIFICATE OF CORRECTION

PATENT NO. : 6,243,549 B1
DATED : June 5, 2001
INVENTOR(S) : Eiichi Ando

It is certified that error appears in the above-identified patent and that said Letters Patent is hereby corrected as shown below:

Title page, Item [54] and Column 1, line 1,
Title, "PLURALITY" should read -- PLURALITY OF --.

Title page,
Item [63], Related U.S. Application Data, "Continuation" should read -- Divisional --.

Column 1,
Line 5, "continuation" should read -- divisional --.
Line 6, "Nov. 2," should read -- Nov. 26, --.

Column 14,
Line 17, "back" should read -- back sides --.

Column 16,
Line 41, "the" should read -- the back --.

Signed and Sealed this

Seventh Day of June, 2005

JON W. DUDAS
*Director of the United States Patent and Trademark Office*